(12) United States Patent
Ho et al.

(10) Patent No.: US 9,208,497 B2
(45) Date of Patent: *Dec. 8, 2015

(54) METHODS AND APPARATUSES FOR PRIORITIZING ADVERTISEMENTS FOR PRESENTATION

(75) Inventors: Kelvin Ho, San Francisco, CA (US);
Ron Hirson, San Francisco, CA (US);
Ebbe Altberg, Mill Valley, CA (US);
Scott Faber, San Francisco, CA (US);
Sean Van Der Linden, Berkeley, CA (US)

(73) Assignee: YELLOWPAGES.COM LLC, Tucker, GA (US)

( * ) Notice: Subject to any disclaimer, the term of this patent is extended or adjusted under 35 U.S.C. 154(b) by 1465 days.

This patent is subject to a terminal disclaimer.

(21) Appl. No.: 11/559,860

(22) Filed: Nov. 14, 2006

(65) Prior Publication Data
US 2007/0078717 A1   Apr. 5, 2007

Related U.S. Application Data

(60) Provisional application No. 60/862,707, filed on Oct. 24, 2006.

(51) Int. Cl.
*G06Q 30/00* (2012.01)
*G06Q 30/02* (2012.01)
(Continued)

(52) U.S. Cl.
CPC ............ *G06Q 30/02* (2013.01); *G06Q 30/0247* (2013.01); *G06Q 30/0254* (2013.01); *G06Q 30/0273* (2013.01); *H04M 1/00* (2013.01); *H04M 3/42* (2013.01); *H04M 15/00* (2013.01); *H04M 15/10* (2013.01); *H04M 15/18* (2013.01); *H04M 15/59* (2013.01)

(58) Field of Classification Search
CPC .......... G06Q 30/0247; G06Q 30/0254; G06Q 30/0273; H04M 3/42; H04M 15/10; H04M 15/00; H04M 15/18; H04M 15/59
USPC .............. 705/14.46, 14.52, 14.69; 379/88.09, 379/114.01, 114.13, 133, 139
See application file for complete search history.

(56) References Cited

U.S. PATENT DOCUMENTS 5,793,851 A   8/1998   Albertson
5,937,390 A   8/1999   Hyodo
(Continued)

FOREIGN PATENT DOCUMENTS

EP   1489529   12/2004
WO   03030507   4/2003
WO   2008052083   5/2008

OTHER PUBLICATIONS

International Application No. PCT/US07/82439, Written Opinion and International Search Report, Feb. 21, 2008.
(Continued)

*Primary Examiner* — Raquel Alvarez
(74) *Attorney, Agent, or Firm* — Alston & Bird LLP

(57) ABSTRACT

Methods and apparatuses for sorting seller listings or advertisements of a seller network. One embodiment includes: determining an indicator of potential revenue that is expected to be generated from presentation of advertisements, based on statistical data indicating performance of the advertisements; and presenting one or more of the advertisements based at least partially on the indicator of potential revenue.

14 Claims, 15 Drawing Sheets

(51) Int. Cl.
  *H04M 15/00* (2006.01)
  *H04M 15/10* (2006.01)
  *H04M 1/00* (2006.01)
  *H04M 15/18* (2006.01)
  *H04M 3/42* (2006.01)

(56) References Cited

U.S. PATENT DOCUMENTS

| | | | |
|---|---|---|---|
| 6,233,566 | B1 | 5/2001 | Levine et al. |
| 6,757,710 | B2 | 6/2004 | Reed |
| 6,978,270 | B1 * | 12/2005 | Carty et al. ............ 1/1 |
| 7,062,453 | B1 | 6/2006 | Clarke |
| 7,085,745 | B2 | 8/2006 | Klug |
| 7,146,429 | B2 | 12/2006 | Michel |
| 7,373,599 | B2 | 5/2008 | McElfresh et al. |
| 7,886,067 | B2 | 2/2011 | Krassner et al. |
| 8,027,878 | B2 | 9/2011 | Wong et al. |
| 8,027,898 | B2 | 9/2011 | Faber et al. |
| 2002/0004735 | A1 | 1/2002 | Gross |
| 2002/0077930 | A1 | 6/2002 | Trubey et al. |
| 2002/0095331 | A1 | 7/2002 | Osman et al. |
| 2002/0110234 | A1 * | 8/2002 | Walker et al. ............ 379/266.01 |
| 2002/0160766 | A1 | 10/2002 | Portman et al. |
| 2002/0173319 | A1 | 11/2002 | Fostick |
| 2003/0046161 | A1 | 3/2003 | Kamangar et al. |
| 2003/0220866 | A1 * | 11/2003 | Pisaris-Henderson et al. . 705/37 |
| 2004/0039640 | A1 | 2/2004 | Koppelman et al. |
| 2004/0103024 | A1 | 5/2004 | Patel et al. |
| 2004/0199422 | A1 | 10/2004 | Napier et al. |
| 2004/0249709 | A1 * | 12/2004 | Donovan et al. ............ 705/14 |
| 2004/0254859 | A1 | 12/2004 | Aslanian |
| 2005/0119957 | A1 | 6/2005 | Faber et al. |
| 2005/0149396 | A1 | 7/2005 | Horowitz et al. |
| 2005/0289026 | A1 | 12/2005 | Dunn et al. |
| 2006/0026061 | A1 | 2/2006 | Collins |
| 2006/0069610 | A1 | 3/2006 | Rossini |
| 2006/0149624 | A1 | 7/2006 | Baluja et al. |
| 2007/0174124 | A1 | 7/2007 | Zagofsky et al. |
| 2007/0192300 | A1 | 8/2007 | Reuther et al. |
| 2008/0301190 | A1 | 12/2008 | Lockhart et al. |
| 2008/0313277 | A1 | 12/2008 | Altberg et al. |
| 2009/0157593 | A1 | 6/2009 | Hayashi et al. |
| 2010/0017266 | A1 | 1/2010 | Faber et al. |
| 2011/0264517 | A1 | 10/2011 | Ho |

OTHER PUBLICATIONS

USPTO Transaction History of U.S. Appl. No. 10/465,770, filed Jun. 18, 2003, entitled "Method and Apparatus for Prioritizing a Listing of Information Providers."

USPTO Transaction History of U.S. Appl. No. 11/072,147, filed Mar. 3, 2005, entitled "Methods and Apparatuses for Sorting Lists for Presentation."

USPTO Transaction History of U.S. Appl. No. 11/077,516, filed Mar. 9, 2005, entitled "System and Method to Merge Pay-for-Performance Advertising Models."

USPTO Transaction History of U.S. Appl. No. 11/688,245, filed Mar. 19, 2007, entitled "Methods and Apparatuses for Prioritizing Featured Listings."

USPTO Transaction History of U.S. Appl. No. 11/863,208, filed Sep. 27, 2007, entitled "Systems and Methods to Provide Communication References from Different Sources to Connect People for Real Time Communications."

ISA/US, International Search Report for International Application No. PCT/US05/12061, 3 pages, Nov. 17, 2006.

International Application No. PCT/US06/07023, Written Opinion and International Search Report, Aug. 7, 2007.

International Application No. PCT/US06/07047, Written Opinion and International Search Report, Aug. 9, 2007.

* cited by examiner

METHODS AND APPARATUSES FOR PRIORITIZING ADVERTISEMENTS FOR PRESENTATION

The present application claims priority to Provisional U.S. Patent Application Ser. No. 60/862,707, filed Oct. 24, 2006, the disclosure of which is incorporated herein by reference.

The present patent application is related to U.S. patent application Ser. No. 11/072,147, filed Mar. 3, 2005 and entitled "Methods and Apparatuses for Sorting Lists for Presentation", which claims priority from Provisional U.S. Patent Application Ser. No. 60/656,637, filed on Feb. 25, 2005 and entitled "A System and Method to Merge Pay-For-Performance Advertising Models". The disclosures of the above referenced related applications are incorporated herein by reference.

TECHNOLOGY FIELD

At least some embodiments of the present invention relate to prioritizing advertisements for presentation.

BACKGROUND

The Internet is becoming an advertisement media to reach globally populated web users. Advertisements can be included in a web page that is frequently visited by web users or that returns the result of a user requested search.

Typically, the advertisements included in the web pages contain only a limited amount of information (e.g., a small paragraph, an icon, etc.). The advertisements contain links to web sites that provide further detailed information.

In certain arrangements, the advertisers pay the advertisements based on the number of visits directed to the web sites through the links in the advertisements. Thus, the advertisers pay for the performance of the advertisements.

Performance based advertising generally refers to a type of advertising in which an advertiser pays only for a measurable event that is a direct result of an advertisement being viewed by a consumer.

Paid inclusion advertising is a form of performance-based search advertising. With paid inclusion advertising, an advertisement is included within a result page of a search. Typically, each selection (e.g., click) of the advertisement from the result page is the measurable event for which the advertiser pays. In other words, payment by the advertiser is typically on a per click basis.

Paid placement advertising is another form of performance-based advertising, similar to paid inclusion advertising. Typically, the payment for paid placement advertising is also on a per click basis. With paid placement advertising an advertiser wants the opportunity of having a particular advertisement placed at a prominent spot, e.g., at the top of a search engine result page, thereby to increase the odds of the advertisement being viewed.

In paid inclusion advertising or paid placement advertising, the advertiser may adjust the price the advertiser is willing to pay for each selection (e.g., click) to balance the cost for the advertisement and the odds of obtaining the desired prominent spot or a high position in a list of advertisements.

For example, one advertising site may create a single queue of advertisements, which is sorted based on the per-click price specified by the advertisers. Adjusting the prices allows the advertisers to change their own placement and the advertisement cost.

Currently, a search engine web site can present a list of advertisers/advertisements in response to a user request for certain information. The list of advertisers/advertisements may be sorted or selected for presentation partially according to the relevancy of the advertisements to the information requested by the user. The advertisers/advertisements may be sorted or selected for presentation partially according to the price the advertisers specified for payment of the performance of the advertisements.

In an existing advertising network, a web site may sort the pool of advertisements into two separate queues. One queue is for the direct advertisers of the web site; and the other is for the indirect advertisers of the web site. The entire queue of the direct advertisers is sorted ahead of the indirect advertisers so that the direct advertisers are better served than the indirect advertisers on the web site.

SUMMARY OF THE DESCRIPTION

Methods and apparatuses for sorting seller listings or advertisements of a seller network are presented. One embodiment includes: determining an indicator of potential revenue that is expected to be generated from presentation of advertisements, based on statistical data indicating performance of the advertisements; and presenting one or more of the advertisements based at least partially on the indicator of potential revenue.

The present invention includes methods and apparatuses that perform these methods, including data processing systems that perform these methods and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
FIG. 1 illustrates a seller network according to one embodiment of the present invention.

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

One embodiment of the present invention provides a system of a seller network. The seller network includes a number of supply affiliates who provide or supply sellers for the seller network. The seller network also includes a number of demand affiliates who drive the demand of the customers to the seller network. Some affiliates can be both supply affiliates and demand affiliates.

Demand affiliates can be used to drive traffic to a seller or a network of sellers, especially in the Internet world. For instance, third-party web sites may be rewarded for driving consumer demand to a network of sellers.

However, in some marketplaces, supply is more difficult to come by, especially marketplaces that rely upon many different sellers. It may be advantageous when the seller or seller network is large and diversified enough to satisfy the customers generated through the demand affiliates.

In one embodiment of the present invention, a system rewards supply affiliates in addition to demand affiliates. The system provides a platform to attract and reward generators of both demand and supply.

In one embodiment, the system provides a user interface or application programming interface (API) through which suppliers of sellers can supply their sellers into the network. Affiliates can add their sellers to the network, manage their sellers from the system interface, and maximize the benefit they receive through manipulating the way they display network listings on their own demand sites, such as through manipulating the sorted order of the listings. A media channel delivering seller listings, advertisements or similar advertising information to the potential customers can be called a demand site.

In one embodiment, the system provides the supper affiliates with tools to manage and track the performance of their sellers, both individually and as a whole. In return for supplying the sellers to the seller network, the system rewards the supply affiliates. In one embodiment, the supply affiliate reward is based on the leads received, or the commerce conducted through the network or other measurable benefits received, by the sellers of the supply affiliates. Supply affiliate reward can be manifested in various forms including, but not limited to, percentile commissions, revenue share on lead charges or commerce transactions, bounties, lump sums, etc.

In one embodiment, a supply affiliate can be anyone with access to existing or potential sellers that may be brought into the seller network. For example, a supply affiliate can be an individual who recommends friends to join the network. A supply affiliates can also be a company which pools and manages a set of sellers for the network.

In one embodiment, a supply affiliate of the seller network with a supply affiliate reward system can display seller listings from the seller network on a media channel of the supply affiliate. The seller listings may include the sellers from the supply affiliate and/or from other supply affiliates of the seller network.

In general, a supply affiliate may or may not operate a demand site. When a supply affiliate facilitates a demand site for the seller network, the supply affiliate is also a demand affiliate. In return for facilitating the demand site to reach potential customers, the system also rewards the demand affiliates. In one embodiment, similar to the supply affiliate reward, the demand affiliate reward is based on the leads received, or the commerce conducted or other measurable benefit received, by the sellers through the demand site. The demand affiliate rewards can be manifested in various forms including, but not limited to, percentile commissions, revenue share on lead charges or commerce transactions, bounties, lump sums, etc.

In one embodiment of the present invention, the seller listings are sorted based on maximizing the revenue to the demand affiliate who may also be a supply affiliate, considering both supply affiliate reward and demand affiliate reward, rather than relying on a bidding order of the sellers. Thus, the affiliates may achieve maximum benefit within a seller network.

If all the direct advertisers were unconditionally sorted ahead of the indirect advertisers, greater revenue potential from higher-bidding advertisements from indirect advertisers might be lost.

If the relevant advertisers were sorted according to a strict bidding order, the financial implications of some affiliates of a seller network with a revenue share system might not be well considered. For example, a demand affiliate who is also a supply affiliate may be losing out by not getting the higher revenue from their own sellers, who, although may have lower bids, would provide both the demand affiliate reward and the supply affiliate reward to generate a higher overall revenue for the affiliate. This would create an uneven distribution of seller impressions on demand sites; and suppliers of sellers with demand sites might lose out on potentially greater revenues.

In one embodiment of the present invention, the seller listings (or in general, advertisements) are sorted at a demand site according to the revenue for a particular party in the seller network, such as a demand affiliate who may or may not be a supply affiliate, to overcome the limitations of the traditional sorting methods.

In one embodiment, when the demand affiliates sort the seller listings of a seller network to increase their respective revenues, the system effectively gives sellers better exposure on the demand sites of their suppliers, while still having a wider distribution of demand site impressions. The network effect can be maximized. The sellers can be displayed on various possible demand sites of the network, while less aggressive lower-bidding sellers can still rely on an advantage on the demand sites of their own supplier. This creates value for the entire network, but also ensures suppliers of sellers with demand sites that they can achieve the maximum amount of revenue for their position in the network.

In one embodiment, the affiliates can access the system to see reporting interfaces that encapsulate both the performance of their sellers and the subsequent supply affiliate rewards.

Note that in the present application, "advertisement" may refer to various different forms of presentations to attract attention or patronage. An advertisement may be simply a listing of identity and contact information (e.g., in a web page, a print media, a telephonic listing service, etc.), or a passage including one or more statements about business offering, etc., or a banner with graphical content and/or animation embedded in a web page, or a voice message presented in a voice channel (e.g., radio broadcasting, a voice portal with Interactive Voice Response (IVR), which may accept user input through voice recognition or through keypad input generated Dual Tone Multi-Frequency (DTMF) signals), or others.

Further details are provided below.

In one embodiment of the present invention, affiliates can upload their sellers into a seller network, manage their sellers and maximize the total revenue using a new sorting method (e.g., when displaying network listings on the demand site of an affiliate who is both a supply affiliate and a demand affiliate).

In one embodiment, to get suppliers of sellers integrated into a network, the system provides a user interface or API through which supply affiliates can set up or upload their sellers into the network. The system interface provides tools for the supply affiliates to manage and track the performance of their sellers, both individually and as a whole. In return for supplying the sellers, the system rewards the supply affiliates based on the received leads or conducted commerce in the forms of percentile commissions, revenue share on lead charges or commerce transactions, bounties, lump sums, etc.

A supply affiliate who owns demand sites in the network has several ways to achieve revenue/kickbacks, including: (1) getting kickback when a seller from the affiliate is connected to a consumer through the network on someone else's demand site (supply affiliate reward), (2) getting kickback when a seller from another affiliate is connected to a consumer on the demand site of the affiliate (demand affiliate reward), and (3) getting kickback when a seller from the affiliate is connected to a consumer through the demand site of the affiliate (both the supply and demand affiliate kickbacks). Of these three scenarios, the supply affiliate can affect the relative frequencies of (2) and (3) by adjusting how the seller listings from the network are displayed on the affiliate's own demand sites to favor listings that increase total revenue, which may be from both supply and demand affiliate rewards or from only demand affiliate rewards. To achieve increasing benefit on the demand sites, the affiliates can sort network listings based on maximizing revenue potential for themselves, rather than relying on a strict bidding order. Given this position within the network, the sorted order implemented for displaying network listings on the demand sites effectively functions as a lever for controlling the revenue stream. Affiliates can exploit such a control to maximize revenues for themselves. Further, affiliates may access the system to see reporting interfaces that encapsulate both the performance of their sellers and the subsequent rewards to the supplier.

In one embodiment, a supplier of sellers can be a large-scale supplier, such as an advertiser supply company, or a single person taking part in a "seller referral program." For example, an individual person who brings in one seller to the network through referral and earns some percentage of kickback is also a supplier or supply affiliate. Thus, suppliers can be in a number of different forms.

In this description, the notion of a "seller" is independent of which party is paying for the network's services. For example, a lawyer who is advertising his/her business may pay for leads generated through an advertising network. On the other hand, the same lawyer may exist as a seller in an advice network where buyers pay for his/her consultation delivered through the network. In general, a seller can be a seller of products, goods, services, advice, etc., at an online or offline marketplace. An affiliate who brings such a seller to the marketplace is bringing value to the network, and therefore may be rewarded with a supply affiliate reward.

In one embodiment, the seller network is used to deliver seller listings (and in general, advertisements for the sellers) to potential customers. In one embodiment, the communications to obtain the seller listings are coordinated through the network. A seller network may distribute seller listings through various channels including, but not limited to, distribution on search-based web sites on the Internet, Wireless Application Protocol (WAP) servers, an Interactive Voice Response (IVR) telephony voice portal serving advertisements, an interface through which a live operator communicates seller listing information to customers, or print media, etc. Once the seller listing is presented to the customer, the connection between the customer and the seller can be performed through any type of communication medium including, but not limited to, phone calls (e.g., conventional landline based telephonic connection, wireless cellular connection, Voice over Internet Protocol (VoIP)), chat, video calls, e-mails, text messages, etc.

In one embodiment, seller listings (and in general, advertisements for the sellers) are sorted to maximize revenue for the owner of a demand site. Based on data attributes available to the owner of the demand site, many variations in sorting can be implemented. Some examples are provided below. In general, the listing data available to an affiliate is sorted according to the potential of total revenue to the affiliate to maximize revenue for the affiliate.

For example, consider a network in which sellers have set prices/bids for placement of their listings, and demand sites achieve a higher revenue percentage on transactions through the network if they are also the supplier of the seller listing. A given demand site may make 40% of the revenue when a transaction is completed from that demand site between a customer and an arbitrary network seller who was not supplied by the affiliate who owns the demand site, and 60% when the network seller was also supplied by the affiliate who owns the demand site. In this case, seller listings can be sorted for the demand site of the affiliate in decreasing order based on the potential total revenue for the affiliate, which may be computed from multiplying the seller listing bid by the percentage of revenue the affiliate makes from a transaction associated with that listing.

The seller network may also track click-through-rates, which shows the ratio of the number of users clicking through the links of the advertisement over the number of advertisement presentations. Click-through-rate represents the likelihood of a click-through resulting from the advertisement.

Similarly, when the advertisement is charged on the telephonic connections made as a result of the advertisement, call-through rate can be tracked and used to indicate the likelihood of a telephonic call resulting from the advertisement.

When an indicator of the likelihood of generating revenue from an advertisement for an affiliate is available, such as click-through-rates or call-through rates, the potential total revenue for the affiliate from an advertisement can be better estimated based on such statistical data. For example, the potential total revenue for the affiliate can be computed from multiplying the seller listing bid by the percentage of revenue the affiliate makes from a transaction associated with that listing and further by the indicator of the likelihood of generating revenue from that listing.

Thus, based on the revenue splitting schemes and/or the statistical data of revenue generating ratios, etc., the seller listing can be sorted to increase the total revenue that may be generated.

In general, a distributor of seller listings (and in general, advertisements) can utilize a system of the present invention regardless of supplier type, seller type, distribution method, and communication medium. Various detailed methods can be used in sorting the listings to increase revenue for a specific party of the system. When the affiliate has access to a number of sellers for displaying or distributing seller listings from the network, the affiliate can manipulate the sort order in the displaying of seller listings to maximize revenue to the supplier.

In one example, company X is an online marketing company that signs up and manages a number of advertisers, and distributes their advertisements (seller listings) through Company X's demand sites. The company decides to take its pool of sellers and function as a supply partner to a larger advertising network. With this arrangement, Company X displays advertisements from the network's advertisers on Company X's demand sites; and Company X's supply of advertiser listings will be displayed on other demand sites throughout the network. After making this decision, Company X accesses the network's system and uploads their advertiser listings into the network. Using the network's system, Company X can manage the listings and view reports of the performance of each of the individual listings as well as their performance as a supply affiliate.

Within the system, Company X's supply of sellers can be added to the pool of network advertisers for display on other demand sites; and Company X displays advertisements from the pool of the network's listings. Advertisers place bids for each of their listings which represent how much they are willing to pay for a customer lead through the network. When a transaction with one of Company X's advertiser's listings occurs on a different demand site (not owned by Company X), Company X receives 20% of the bid amount. However, when a transaction occurs on one of Company X's demand sites, they receive 40% of the bid amount if the listing was not from their supply, and 60% of the bid amount if the listing was from their own supply. The balance between transactions on Company X's demand sites that yield 40% and 60% effectively functions as a lever through which Company X can affect the revenue stream from their demand sites. In other words, Company X can potentially earn more from their demand sites by increasing the frequency of transactions that yield 60% relative to the frequency of transactions that yield 40%, if the bid amounts are about the same.

Company X previously sorted strictly by bid to display advertisements on Company X's demand sites. This might be sufficient before Company X joins the network. However, Company X is now a part of a large network where the revenue split varies for different sellers. According to one embodiment of the present invention, Company X may implement a new method of sorting the listings to increase revenue. For example, the listings can be sorted based on the bid amount multiplied by the percentage of revenue Company X receives.

If the previous sorting method were used, Company X would suffer the opportunity costs of not giving precedence to lower-bidding, higher-revenue-yielding listings over listings with higher bids but lower revenue yield. For example, using the old method a listing from a different supplier in the network with a $10 bid would be placed higher than a listing from Company X's supply with a $9 bid. Using the new method, the $9 bid listing would be placed higher. This is because Company X would effectively earn $5.40 when the customer communicates with the $9 advertiser, but only $4.00 when the customer contacts the $10 advertiser. Using the new method, the listings on the demand sites of Company X are sorted in a way to provide the most exposure for listings of the highest revenue yield for Company X.

Thus, the system allows suppliers of sellers with demand sites to maximize their revenue within a network that utilizes supply affiliate kickbacks. By implementing a revenue-maximizing sort order on their demand sites, a supplier may achieve an optimal revenue-yielding position within the network.

In general, applicability of embodiments of the present invention is independent of supplier type, seller type, distribution method, communication method, or minor variations in sorting criteria. To illustrate this point, consider the following separate example.

Company Y runs a web site that functions as a service marketplace to bring together buyers and sellers of live advice. Company Y manages hundreds of advisors who have listings to sell live tax advice through phone calls (VoIP or POTS) to customers at a set per-minute rates (each listing has its own rate). Company Y decides to join a large network of live advisors which includes business advice, psychic readers, etc. Company Y then uploads their live tax advisor listings into the network and manages them through the network system interface. Now Company Y's tax advisors can have their listings displayed on all of the demand sites in the network; and, Company Y also displays the listings for other advisors in the network on Company Y's own demand sites using Company Y's own sorting scheme. The network also distributes listings through other mediums as well, such as displaying on various mobile devices.

Previously, Company Y earned a fixed percentage of the total transaction charge and sorted the listings purely based on the per-minute rate that advisors charge for their services. However, Company Y is now a part of a large network with supply partner kickbacks. According to one embodiment of the present invention, Company Y can implement a revenue-maximizing rule for sorting lists on their demand sites.

As the supply affiliate part of the network contract, Company Y earns 20% of the revenue from transactions initiated through their demand sites if the advisor is a network seller not from their supply, and 30% of the revenue from transactions initiated on their demand sites where the advisor is from their supply. On the demand sites of Company Y, the listings are now sorted in descending order of (advisor rate)×(revenue split). Thus, a tax advisor listing from Company Y's supply charging a rate of $5.00 per minute would be placed higher than another advisor listing from the network (but not from Company Y's supply) that charges a rate of $6.00. This is because Company Y would earn $1.50 per minute on transactions between customers and the $5.00 per min advisor, but only $1.20 per minute on transactions between customers and the $6.00 per min advisor.

The above examples demonstrate how a supplier of sellers can maximize the revenues earned on demand sites of the supplier when the supplier is within a large seller network that utilizes supply partner kickbacks. The benefit is provided to suppliers of sellers in the second example as it does in the first one, even though the above examples have different types of sellers, distribution methods, and communication methods, etc.

In one embodiment, the sellers of a supply affiliate can be added to the network pool of sellers, through a system-provided interface or API, which may include mass upload functionality and/or individual add/delete functionality.

FIG. 1 illustrates a seller network according to one embodiment of the present invention.

In FIG. 1, seller databases of supply affiliates (e.g., 105, 115) can be uploaded (e.g., 107, 117) into the seller network database (120). For example, seller database of suppler affiliate S (105) may include a list of sellers (e.g., 101) with seller price bids (e.g., 103). Similarly, seller database of suppler affiliate Y (115) may include a list of sellers (e.g., 111) with seller price bids (e.g., 113).

In one embodiment, the supply affiliates may upload/supply their sellers into the seller network using different interfaces, such as a user interface which allows the manipulation of individual seller records, or an API that allows mass uploading. For example, seller records may be updated, added or deleted one at a time. Alternatively, the seller records may be submitted in a file transmitted through a network connection; and the file of seller records is then parsed for adding, deleting, and/or updating the seller records. For example, the file can be in an Extensible Markup Language (XML) or in a custom format.

In one embodiment, different supply affiliates may provide different types of seller records. For example, a supply affiliate in a referral program may provide the identity of the sellers. When the sellers join the network, the supply affiliate is rewarded with supply affiliate reward for the referral effort. Thus, in general, the supply affiliate may or may not provide the seller price bid information.

In the example of FIG. 1, the seller network database (120) includes the information of sellers (e.g., 121), seller price bids (e.g., 123), supply affiliates (e.g., 125) from whom the sellers are supplied to the network, supply affiliate rewards (e.g., 127) which are to be rewarded to the corresponding supply affiliate from revenue generated according to the seller price bids (123), demand affiliate rewards (e.g., 129) which are to be rewarded to the corresponding demand affiliate from revenue generated according to the seller price bids (123), and other information, such as click-through rates, call-through rates, etc.

In one embodiment, the supply affiliate rewards may be different percentages of the seller price bids for different sellers or for different supply affiliates. Alternatively, the supply affiliate reward for all sellers, or all sellers of a particular supply affiliate, may have the same percentage based on the seller price bids. Thus, sellers or certain groups of sellers may share the same data about supply affiliate rewards.

Similarly, sellers or seller groups may also share the same data about demand affiliate rewards.

Thus, in general, the seller network contains information about revenue sharing among various parties in the network, which may be organized different from that illustrated in FIG. 1.

In one embodiment, the seller network specifies the supply affiliate rewards and the demand affiliate rewards. For example, for supply affiliate of a referral program, the supply affiliate rewards may be a predetermined percentage (e.g., 5%) of the seller price bids. In one embodiment, supply affiliates may specify the supply affiliate rewards. For example, a supply affiliate may specify a percentage of seller price bids as the supply affiliate rewards, which can be adjusted by the supply affiliate to balance the revenue from individual transaction and the likelihood of successful transaction. When the supply affiliate reward is reduced, the demand affiliate reward can be increased; and the sellers of the supply affiliate are more likely to be displayed on the demand sites of other affiliates.

Similarly, the demand affiliate rewards may also be specified by different parties, such as the seller network, the supply affiliates, the demand affiliates, etc.

In one embodiment of the present invention, one same seller may be supplied to the seller network by different supply affiliates. To include the seller's listing, demand affiliates may select the supply affiliate according to the supply affiliate reward and/or demand affiliate reward.

In one embodiment, the seller network tracks the statistic data about transactions (e.g., click-through rates, call-through rates, etc.). The demand affiliates may use the statistic data in computing potential revenues when sorting seller listings. The supply affiliates may use the statistic data to evaluate the performance of their sellers.

Alternatively, the supply affiliates may track the statistic data about transactions and provide the data to the seller network.

In one embodiment of the present invention, the demand affiliates of the seller network use (e.g., 131, 133) the seller network database to present seller listings for their users. For example, the media channel of supply affiliate S (135) (e.g., Web/WAP server) may deliver seller listings to user devices A (141) (e.g., computer), user device B (143) (e.g., PDA), etc., in response to the search requests from the users; and the media channel of supply affiliate Y (137) (e.g., SMS based server) may provide seller listings to user device B (143), user devices X (149) (e.g., cellular phone), etc.

In one embodiment, certain entities can be both demand affiliates and supply affiliates of the seller network. For example, in FIG. 1, affiliates S and Y are both supply affiliates and demand affiliates, since they both supply sellers to the network and presents seller listings using the seller network database.

In general, some demand affiliates may not be supply affiliates; and some supply affiliates may not be demand affiliates.

In one embodiment of the present invention, the seller listings are sorted according to total potential revenues for the demand affiliate, which may include both the supply affiliate reward and the demand affiliate reward.

In one embodiment, the seller network sorts the seller listings for the media channel according to an indicator of total potential revenue for the affiliate. Thus, a uniform sorting method can be applied to the media channels of the seller network.

Alternative, the seller network provides the indicator of total potential revenue to the demand affiliates, in addition to the seller price bid or instead of the seller price bid, to allow the demand affiliates to sort the listings according to their own criteria.

Alternatively, different demand affiliates may sort the seller listings differently according their own indicators of total potential revenue.

Figure 2:
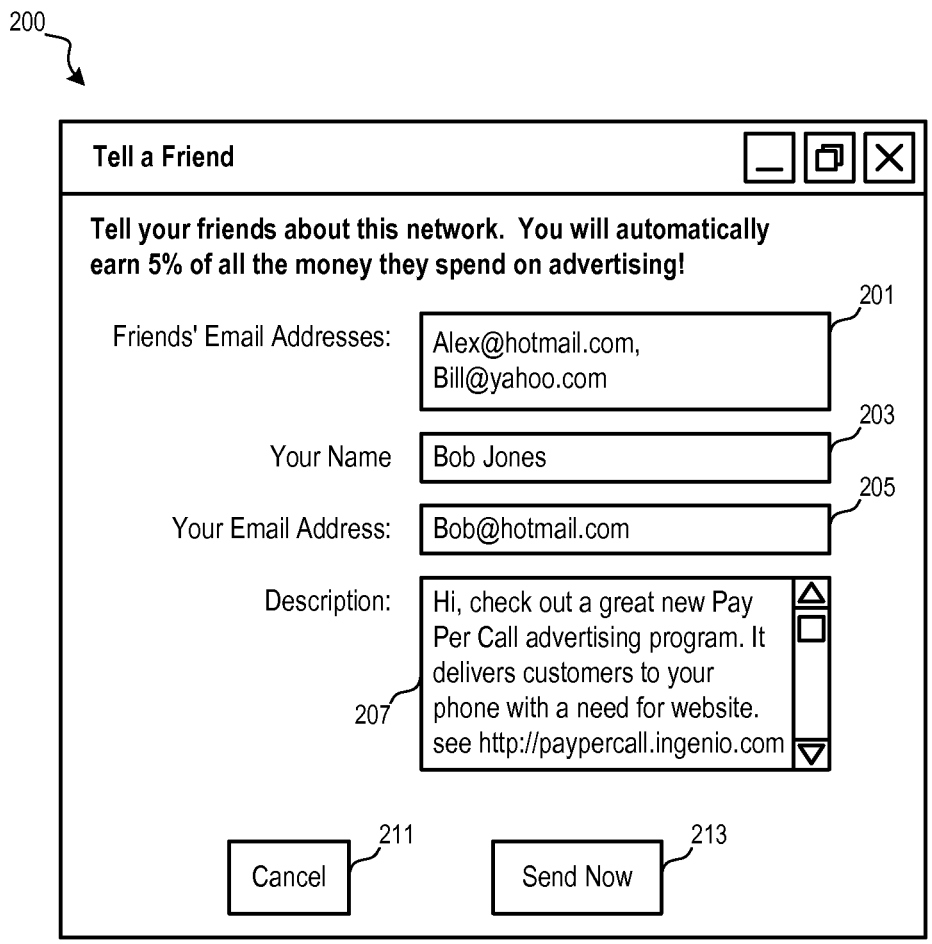
FIG. 2 illustrates a user interface to provide information about sellers from a supplier of a seller network according to one embodiment of the present invention.

FIG. 2 illustrates a user interface to provide information about sellers from a supplier of a seller network according to one embodiment of the present invention.

In FIG. 2, a supply affiliate is in the form of a participant of a referral program. The supply affiliate composes a message to friends through a user interface (200), such as a web page, a web-based email, a custom application program, etc. The "your name" field (203) and "your email address" field (205) are to receive the name and email address of the supply affiliate. The "friends' email addresses" field (201) is to receive a list of email address (e.g., separated by ","). The "description" field (207) is to receive a personalized message from the supply affiliate for referring the network (e.g., a pay per call advertising program).

When the "send now" button (213) is pressed, the personalized message received in the "description" field (207) is sent to the friends of the supply affiliate at the addresses specified in the "friends' email address" field (201). In one embodiment, the emails are sent in a way so that the emails appear to be sent directly from the supply affiliate as indicates in fields (203 and 205).

In one embodiment, a link containing parameters to identify the supply affiliate is added into the email message so that when the friends of the supply affiliate follows the link in the email to join the network, the system adds the friends as sellers of the supply affiliate. The supply affiliate automatically earns a percentage (e.g., 5%) of the money the friends spend on the network as supply affiliate rewards.

Alternatively, a reference number/string can be added to the email message which can be used by the friends to identify the supply affiliate. Alternatively, the email addresses of the friends can be used to correlate the friends with the supply affiliate when the friends join the network.

In one embodiment, the friends set up their advertisements and price bids for the advertisements directly with the network, without further help from the supply affiliate and in a way similar to direct advertisers of the network. However, a percentage of the advertisement spending of the friends goes to the supply affiliate for the referral effort.

Alternatively, the "cancel" button (211) can be pressed to close the interface without sending out the message.

Thus, a supply affiliate can represent a single individual, who may or not be a demand affiliate and who may have only one seller.

Figure 3:
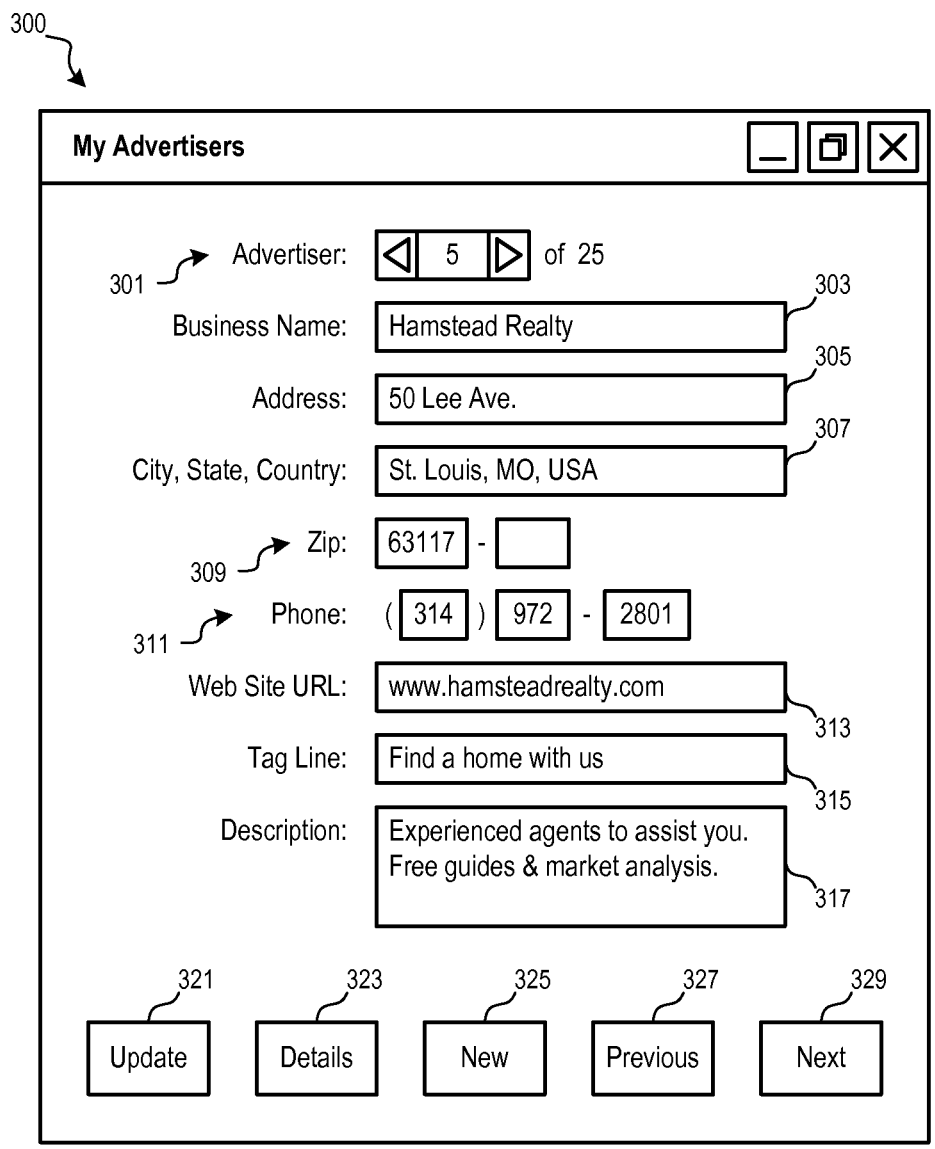
FIG. 3 illustrates a user interface to upload information about sellers from a supplier of a seller network according to one embodiment of the present invention.

FIG. 3 illustrates a user interface to upload information about sellers from a supplier of a seller network according to one embodiment of the present invention.

The user interface (300) allows a supply affiliate to individually access the sellers/advertisers of the supply affiliate. For example, a selector (301) can be used to select a particular advertiser of the supply affiliate.

In FIG. 3, in one embodiment, the user interface (300) is in the form of a web page rendered in a web browser of a user device, such as a computer, a notebook, a PDA, a web terminal, etc. The web page is to be downloaded from a server that is connected to the database for the advertisements. Alternatively, the user interface (300) can be based on a WAP application on a wireless mobile device, such as a cellular phone. Further, similar entry fields can be provided through the use of other communication channels, such as Email, Instant messages, SMS messages, etc. Further, an advertiser may fax a form, or make a telephone call, to provide the information to a human concierge, which uses such a user interface to enter the data into the database (e.g., using a custom application).

In FIG. 3, the user interface (300) contains entry fields for specifying the information an advertiser want to appear on the advertisement. The "business name" field (303) is to receive the name of the advertiser, which can be used to identify the advertiser in the database and in the advertisement.

The address, city, state, country and zip fields (305, 307 and 309) are to receive the location information about the advertiser. The location is typically a site where a potential customer may visit to obtain services and/or products.

The "phone" field (311) is to receive the telephone number at which the advertiser is to receive phone calls from potential customers. In one embodiment of the present invention, the phone number of the advertiser in the phone field (319) is not shown directly to the end users. An encoded/substitute phone number is used in the advertisement, so that when the encoded phone number is called the phone number of the advertiser is determined and connected to. This allows the tracking of phone calls generated from various advertisements for different advertisers and/or generated through different advertisement delivery channels.

The "web site URL" field (313) is to optionally receive a home web page address of the advertiser. In one embodiment, the advertisement is generated to contain a link to the web page as specified in the web site URL field (313) so that if the end user wants further details about the advertiser, the end user may click the link to visit the web page of the advertiser. In one embodiment, the advertiser is not charged for the link directing the web user to the web page of the advertiser. Alternatively, the advertiser may be charged for the link that is clicked to lead the web user to the web page of the advertiser. In one embodiment, the amount the advertiser is charged for the click is automatically computed from the pay per call price according to the click-through rate and call-through rate so that the average click-through revenue and the average call-through revenue is about the same.

In one embodiment of the present invention, the advertisement is not to include a link to the web site URL (313). The web site URL (313) is used to obtain further information about the business of the advertiser so that the advertisement can be placed in relevant media channels.

For example, the web pages at the web site according to the web site URL can be fetched and analyzed automatically to determine topics, categories, keywords, content, etc., so that the placement of the advertisement can be based at least partially on the topics, categories, keywords, content, etc. to increase the chances of the advertisement being of interest to the targeted users.

The "tag line" field (315) and the description field (317) are to receive one or more concise statements about the business offering, the unique ways of meeting customers' needs, how the business stand out from the competition, etc. In one embodiment, the information in the description field is presented in a text form. In one embodiment, the text in the description field can be enhanced with boldface and italic type, as well as formatting, using a Rich Text Editor, as supported by Internet Explorer for Windows or Mozilla Browsers (e.g., Firefox, Netscape, etc.).

In one embodiment, further optional information, such as a logo, an electronic coupon, etc. (not shown in FIG. 3), can be specified for the advertisement. In one embodiment, to provide an electronic coupon, one can simply specify a coupon headline, description and expiration date (if any). The coupon information is then store in the database and presented with the advertisement.

For example, when the "details" button (323) is pressed, a user interface for show further details is displayed. Further details may include electronic coupon information, price bid for advertisement, logo, advertisement budget (e.g., in terms of the number calls per day, monthly spending limit, etc.), targeted geographic area(s) of customers, business categories, key terms, etc.

In one embodiment, the "details" button can be further pressed to view information collected by the network for the supply affiliate, such as advertisement performance (e.g., call-through rate, total number of calls generated in a given time period, total charges/advertisement spending, rewards for the affiliate from the advertiser, etc.)

The "previous" and "next" buttons can be used to navigate through the set of advertisers of the supply affiliate. The "new" button can be used to enter information for a new advertiser of the supply affiliate; and the "update" button can be used to update information of an existing advertiser of the supply affiliate. Further buttons, such as a "delete" button for removing an advertiser, can be included.

In one embodiment, the seller network system further provides an API for the mass updating/uploading of seller information from a supply affiliate. For example, the supply affiliate may use its own application system to collect data about the sellers. The seller information is then communicated to the seller network through a file, or a network communication interface.

Figure 4:
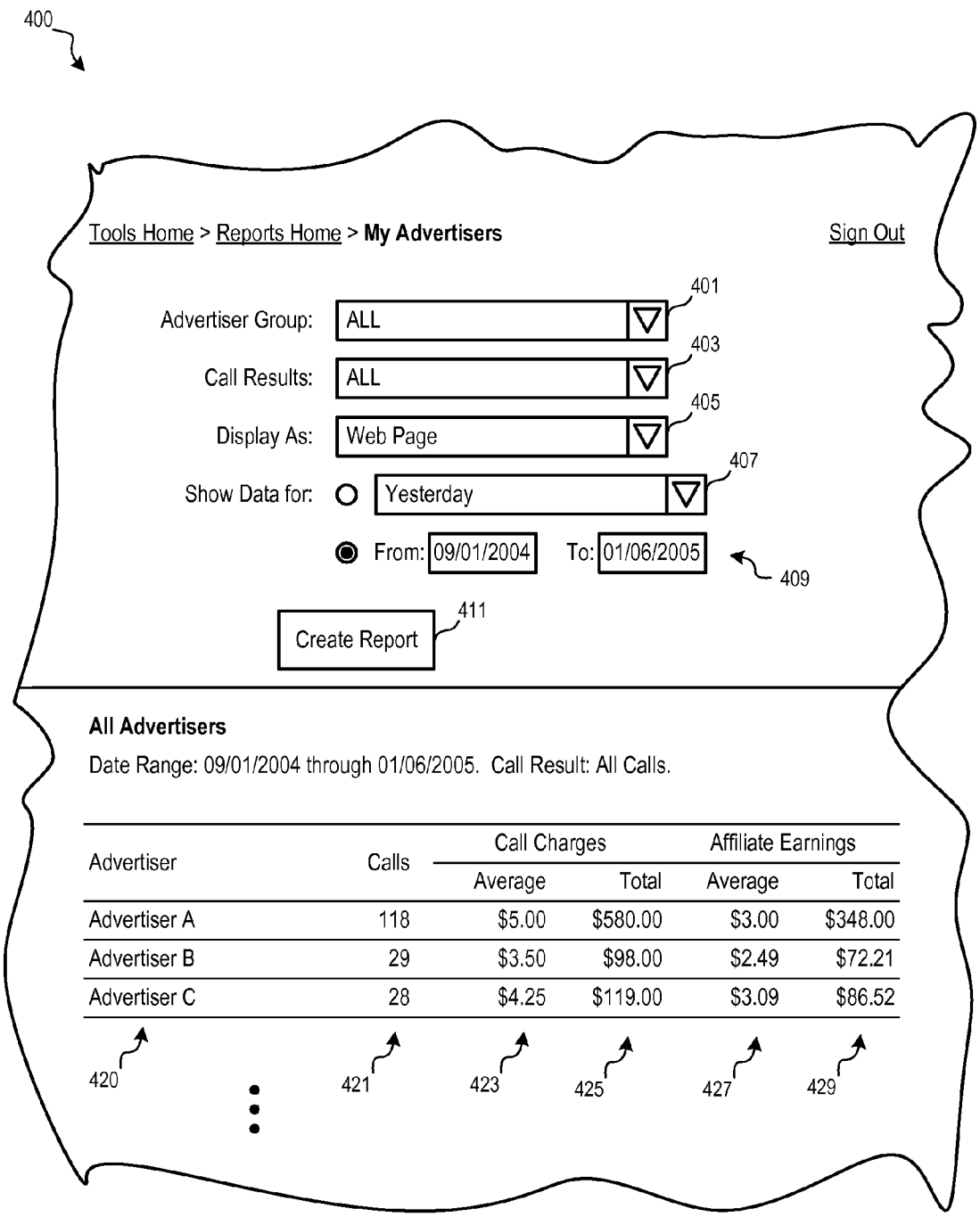
FIG. 4 illustrates a user interface to display affiliate earnings of a supplier of a seller network according to one embodiment of the present invention.

FIG. 4 illustrates a user interface to display affiliate earnings of a supplier of a seller network according to one embodiment of the present invention.

In FIG. 4, a sample reporting interface (400) displays statistics regarding the performance of the seller listings of a supply affiliate and the subsequent revenue to the supply affiliate. From here, the supply affiliate can track the performance of its sellers and the resulting supply affiliate earnings (427 and 429).

For example, the supply affiliate may separate the advertisers into a number of groups and select (401) a group or all groups for viewing. Different types of calls generated from the advertisements for the selected advertisers can be viewed separated or together using the "call results" selector (403). The "display as" selector (405) can be used to specify whether the result is displayed as a web page, an XML document, an email, a fax, a PDF file, etc. Time period selectors (407 and 409) can be used to specify a particular time period for which the activities are reported.

After specifying the parameters of the report, the user can press the "create report" button to obtain the result, which shows information such as the list of advertisers (420) and their corresponding calls (421) received as the result of the advertisement on the seller network, call charges (423 and 425) and affiliate earnings (427 and 429) for the affiliate, etc.

Figure 5:
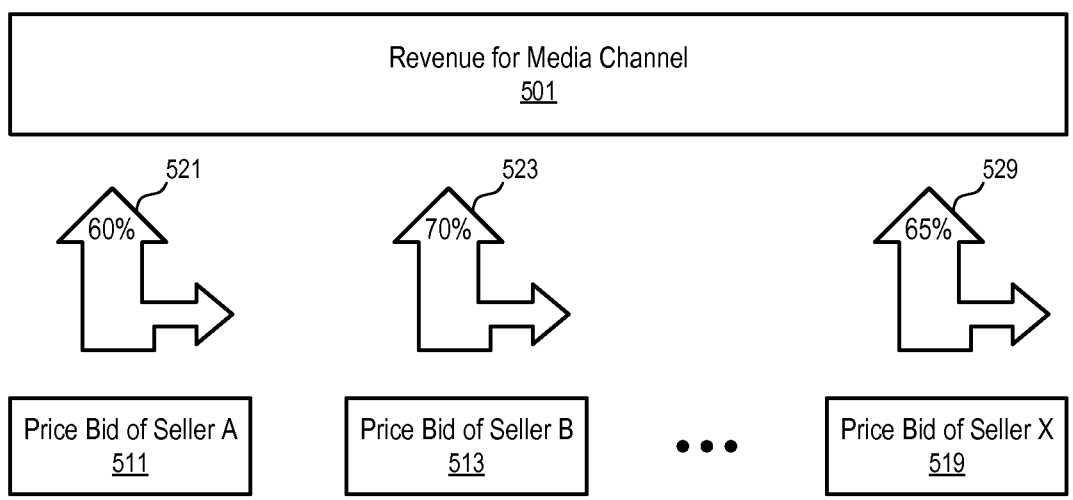
FIG. 5 illustrates a revenue distribution scheme in a seller network according to one embodiment of the present invention.

FIG. 5 illustrates a revenue distribution scheme in a seller network according to one embodiment of the present invention.

In one embodiment of the present invention, as illustrated in FIG. 5, the sellers to be listed/presented/advertised in a media channel provide different percentages (e.g., 521, 523, 529, etc.) of contributions out of the price bids (e.g., 511, 513, 519, etc.) of the sellers to the revenue (501) for the media channel. The revenues generated from the price bids of different sellers are distributed differently to multiple parties. Thus, an order of the price bids of the sellers does not represent an order of revenue potential for the media channel.

In one embodiment of the present invention, the sellers are sorted into a list based at least partially on an indicator of revenue potential, which includes the consideration of the differences in contributions from the price bids to the revenue for the operator of the media channel.

Figure 6:
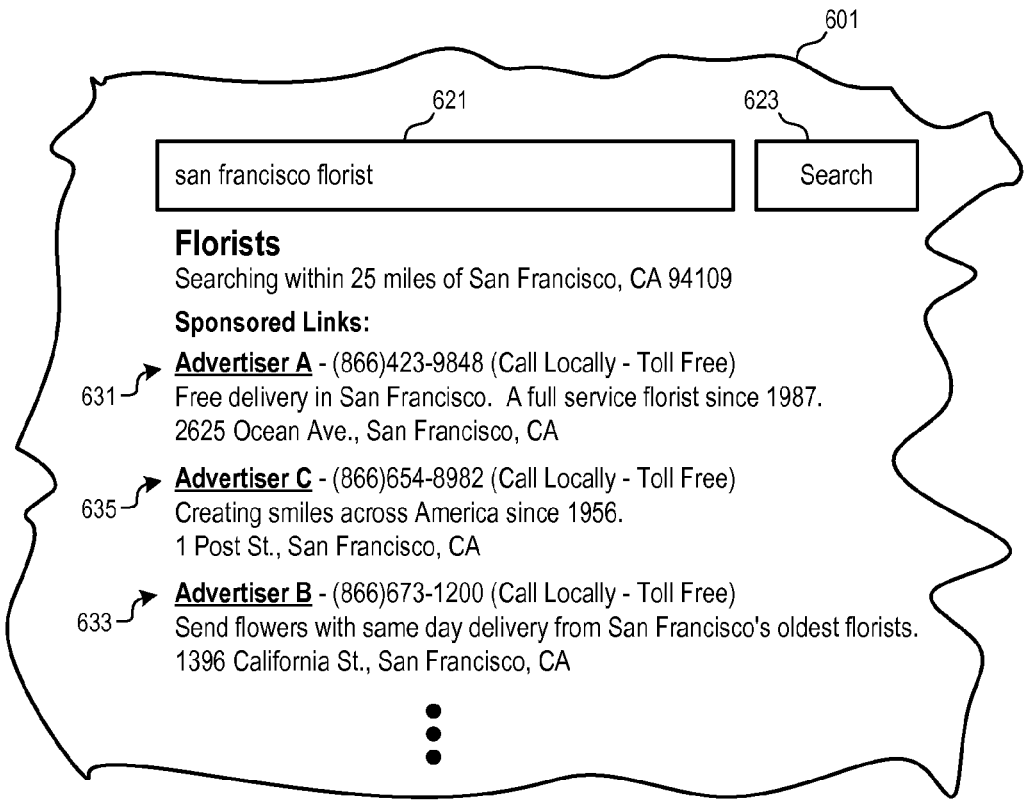
FIG. 6 illustrates a list sorting process to increase revenue for a media channel in a seller network according to one embodiment of the present invention.
Figure 6:
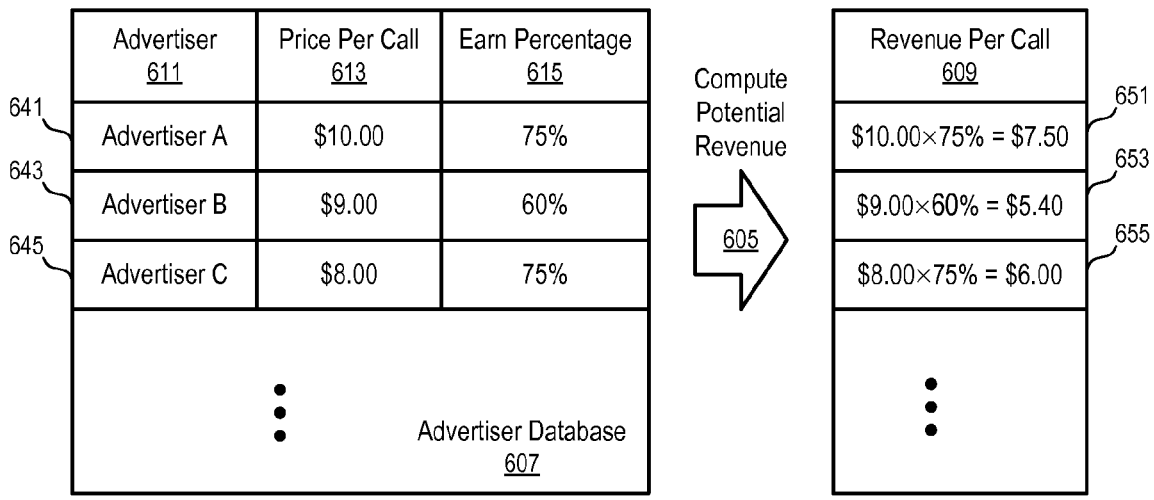

FIG. 6 illustrates a list sorting process to increase revenue for a media channel in a seller network according to one embodiment of the present invention.

In FIG. 6, the advertiser database (607) includes a table of advertisers (611) with corresponding price per call (613) and earn percentage (615) for a media channel. To sort the advertisers, the potential revenue is computed (605). Revenue per call (609) indicates the amount that the media channel can earn out of the advertisements of the corresponding advertisers (611). For example, advertiser A (641) provides revenue per call of $7.50 (651), which is the product of the corresponding price per call and earn percentage.

In the example of FIG. 6, it is seen that the order of the revenue per call can be different from the order of price per call. For example, advertiser B (643) has a higher bid of price per call ($9.00) than advertiser C (645) ($8.00). However, advertiser B (643) has a lower earn percentage (60%) than advertiser C (645) (75%) for the media channel. As a result, the advertiser B (643) has lower revenue per call ($5.40) than advertiser C (645) ($6.00).

Interface (601) illiterates the display of seller listing according to one embodiment of the present invention. After the "search" button is pressed to request the results according to the search terms (621), the relevant advertisers are retrieved from the advertisement database. The candidates for the search results are ranked (603) according to the potential revenue (e.g., 609) for presentation or selection. For example, when the list of candidates is too long, only a top portion of the list is selected for presentation in the search result.

In the example of FIG. 6, the advertisers (631, 635 and 633) are listed in the interface (601) in a decreasing order according to the revenue per call (609), instead of the price per call (613). For example, the advertiser C (635) is listed ahead of the advertiser B (633), because the advertiser C has higher revenue per call (655) than the advertiser B, although the advertiser C has a lower price per call (613) than the advertiser B.

Figure 7:
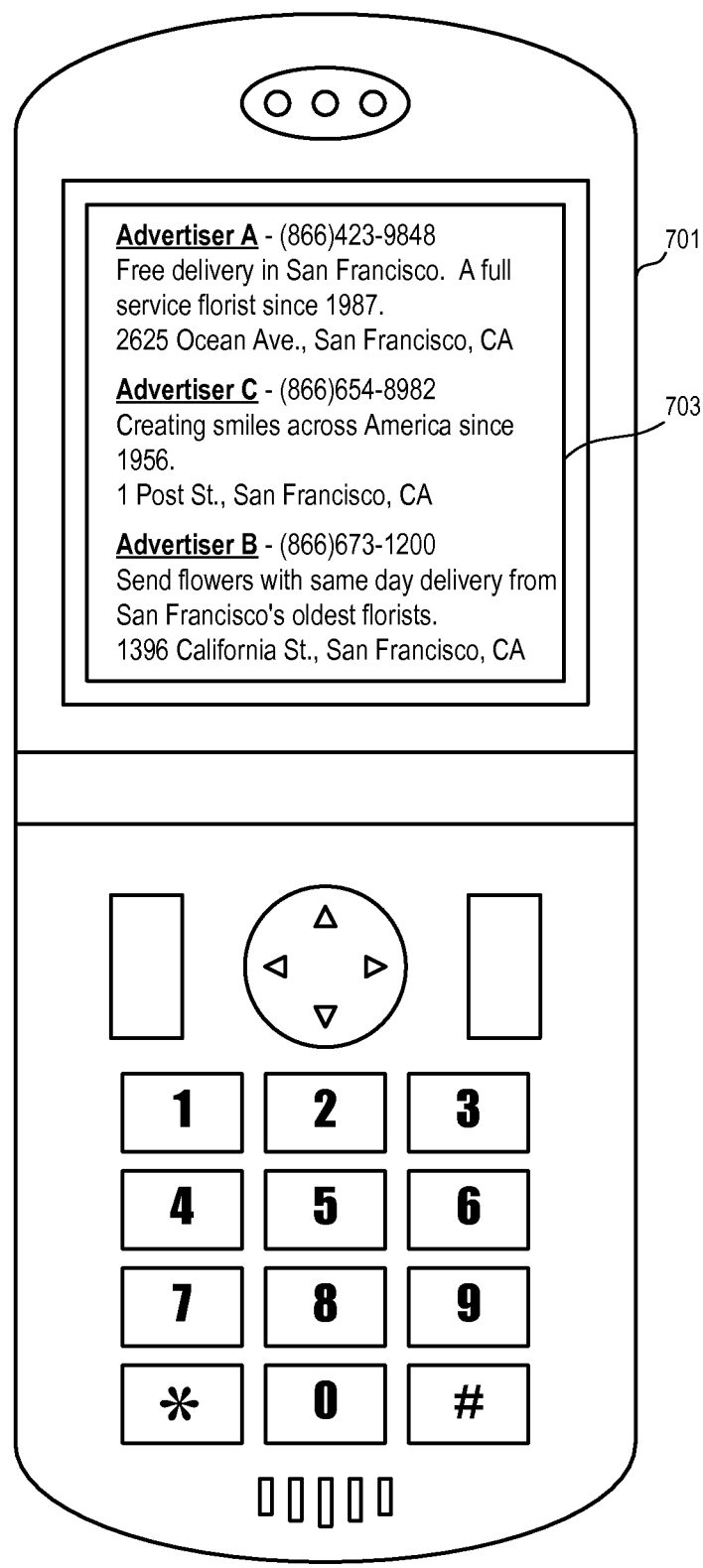
FIG. 7 illustrates an example of showing a list of sellers on a wireless mobile device in a seller network according to one embodiment of the present invention.

FIG. 7 illustrates an example of showing a list of sellers on a wireless mobile device in a seller network according to one embodiment of the present invention.

In FIG. 7, the seller listings (703) are presented on a mobile wireless device, such as a cellular phone (701). The list is sorted in a similar way as illustrated in FIG. 6. In one embodiment, the seller list is presented in response to a search submitted from the cellular phone to a web/WAP server, or a SMS based server. Alternatively, seller list may be presented as the mobile device enters a particular geographic area, in accordance with a preference of the user.

Figure 8:
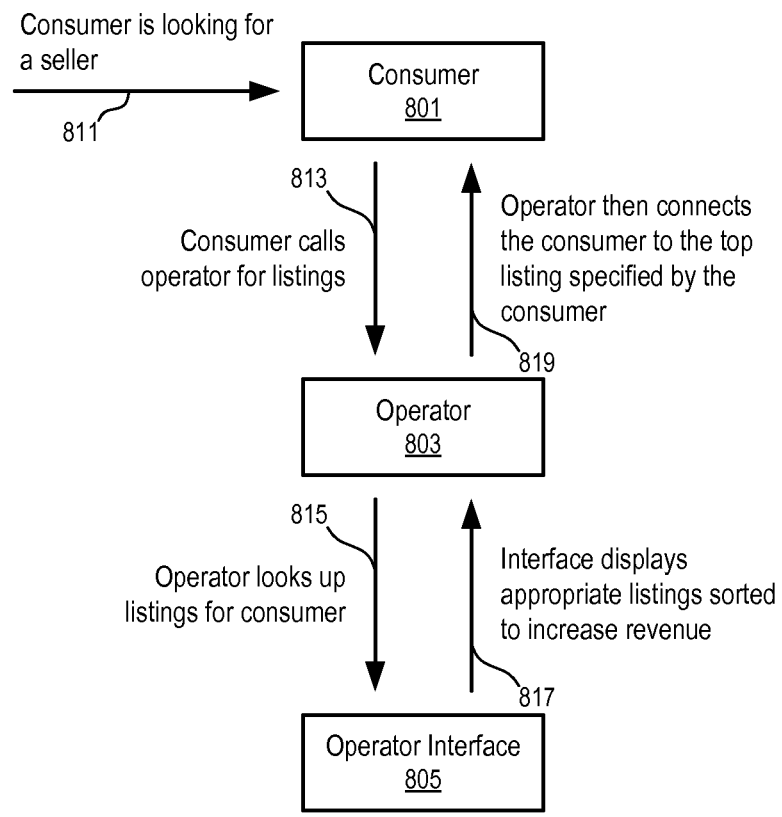
FIG. 8 illustrates a process of accessing sellers in a seller network according to one embodiment of the present invention.

FIG. 8 illustrates a process of accessing sellers in a seller network according to one embodiment of the present invention.

In FIG. 8, the consumer (801) may be looking (811) for a seller. The consumer calls (813) an operator for listings. The operation (803) looks up (815) listings for the consumer using an operator interface (805), which may be a custom application to access the seller network, or through a regular media channel, such as a web browser.

The interface displays (817) appropriate listings sorted to increase revenue for the operator. The operator (803) then connects the consumer to the top listing specified by the consumer.

Alternatively, the consumer may interactive with an IVR system using a voice recognition system and a text-to-speech system.

Thus, in general, the seller listings sorted according to embodiments of the present invention can be displayed or presented to various different entities, which may not be an end consumer.

In one embodiment of the present invention, the revenue share for the affiliates of a seller network is based on measurable events such as clicks on links provided in the listings/advertisements, phone calls generated from the listings/advertisements, etc.

In one embodiment, the seller network system tracks the measurable events and determines the affiliate rewards for the affiliates of the network. Alternatively, the demand and/or seller affiliates may also track the measurable events.

In one embodiment, to track the clicks the links are encoded with one or more parameters which can be used to determine the target address; and the links point to a web site which accepts the requests, records the clicks, determines the target address and forwards the requests to the target address.

In one embodiment, to track the phone calls resulting from the listings/advertisements, the phone numbers provided in the advertisements/listings are encoded so that the phone calls are directed to a phone call tracking facility first.

Figure 9:
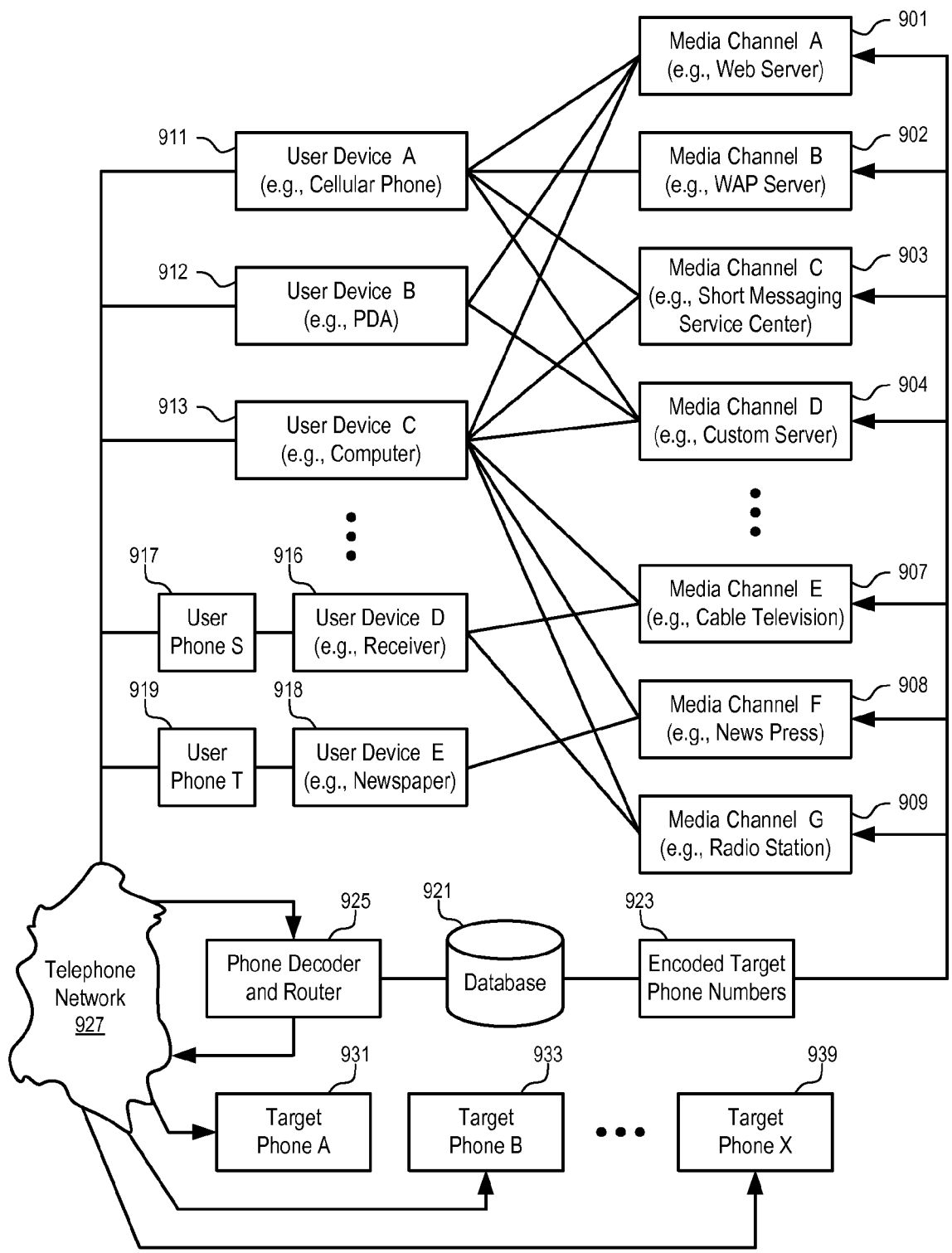
FIG. 9 shows a diagram of a system to make and track phone connections for a seller network according to one embodiment of the present invention.

FIG. 9 shows a diagram of a system to make and track phone connections for a seller network according to one embodiment of the present invention.

In FIG. 9, a database (921) may contain the phone numbers of target phone A (931), target phone B (933), . . . , target phone X (939), etc. Typically, the target phones belong to the institutions, businesses, individuals, etc, which seek for publicity through various media channels, such as media channel A (901) (e.g., web server), media channel B (902) (e.g., WAP server), media channel C (903) (e.g., short messaging service center), media channel D (904) (e.g., custom server), media channel E (907) (e.g., cable television), media channel E (908) (e.g., news press), media channel G (909) (e.g., radio station), etc.

In one embodiment of the present invention, the phone numbers of the target phones are not directly publicized over the media channels. Instead, encoded target phone numbers (923) are used. Using the encoded target phone numbers (923), a user cannot reach target phones directly. The encoded target phone numbers (923) allow the association of additional information with the target phone numbers, such as the media channels used, special promotions, etc.

The encoded target phone numbers are delivered with content information (e.g., web page, WAP page, short message, television programs, news articles, etc.) to user devices, such as user device A (911) (e.g., cellular phone), user device B (912) (e.g., personal digital assistant (PDA)), user device C (913) (e.g., computer), user device D (916) (e.g., receiver), user device E (918) (e.g., newspaper).

For example, one media delivering channel includes print media. A list of advertisements can be sorted according to one embodiment of the present invention before printing (e.g., newspaper). In the example of print media, the list can be sorted to maximize advertisement revenue, although the sorting may not be dynamic in response to a request from an end user.

In another example, a voice portal is used to deliver the advertisements. The voice portal can use an Interactive Voice Response (IVR) system to interact with the user. For example, the IVR system may use voice-recognition or keypad input to receive user input. According to the user input, the advertisements can be sorted dynamically to maximize revenue according to one embodiment of the present invention. In one embodiment, the IVR system presents an advertisement through a text-to-speech technique. Alternatively, the advertisement can be a pre-recorded voice message.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, a SMSC, etc.).

In one embodiment, a user device is capable to dial a phone call (e.g., automatically according to the encoded phone number embedded in the content information when a user selects the number). Alternatively, a user may manually dial a phone call using a separate phone, such as user phone S (917) or user phone T (919).

In one embodiment of the present invention, dialing at least a portion of an encoded target phone number connects the phone call to a phone decoder and router (925) first. According to the encoded target phone number dialed, the phone decoder and router (925) determines the corresponding target phone number using the database (921) and connects the phone call to the corresponding target phone (e.g., one of target phones 931-939) through the telephone network (927).

Note the telephone network (927) may be circuit switched, package switched, or partially circuit switched and partially package switched. For example, the telephone network may partially use the Internet to carry the phone call (e.g., through VoIP). For example, the connection between the user phone/device and the phone decoder and router (925) may be carried using VoIP; and the connection between the phone decoder and router (925) may be carried using a land-line based, circuit switched telephone network.

In one embodiment of the present invention, the information associated with the encoded target phone number, such as the media channel used to provide the encoded target phone number to the users, is also decoded/retrieved using the database (921). Thus, the information associated with the encoded target phone number can be tracked/stored.

In one embodiment, the phone decoder and router (925) also determines the phone number of the user through Automatic Number Identification (ANI). ANI is a phone system feature that provides the billing number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment of the present invention, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment of the present invention, an encoded target phone number has the same number of digits as a standard phone number (e.g., a typical telephone number assigned by a telephone company). Thus, dialing the encoded target phone number is as easy as dialing the target phone number; and dialing the target phone number reaches the phone decoder and router (925). In such an arrangement, a large number of encoded phone numbers are generally required to differentiate the different target phones and different media channels.

In one embodiment of the present invention, an encoded target phone number has more digits than a standard phone number. A first portion of the encoded target phone number has the same number of digits as a standard phone number to reach the phone decoder and router (925) through the telephone network (927); and a second portion of the encoded target phone number is to be decoded by the phone decoder and router (925). For example, the Dual Tone Multi-Frequency (DTMF) decoder can be installed in the phone decoder and router (925) to detect the second portion of the encoded target phone number dialed at the user phone. The detected phone number can then be used to recover the target phone number.

When an encoded target phone number has more digits than a standard phone number, the additional digits can be implemented as a telephone extension, or as an IVR system.

In one embodiment of the present invention, a single telephone number is used to reach the phone decoder and router (925) for different target phone numbers; and the portion of the encoded target phone number that is used to reach the phone decoder and router (925) is not used in determining the information associated with the encoded target phone number.

Alternatively, multiple telephone numbers can be used to reach the phone decoder and router (925); and the entire encoded target phone number can be used to determine the information associated with the encoded target phone number.

In one embodiment of the present invention, the encoded target phone numbers can have different numbers of digits. The advertisers may be arranged to bid for shorter encoded target phone numbers.

In one embodiment of the present invention, the encoded target phone numbers are assigned only when needed for use in a media channel.

In one embodiment, a look-up table approach is used to encode the information. For example, the database (921) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of field separated by "*" or "#". Each of the field can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the phone decoder and router (925). When such a mapping scheme is used, a look up table is not necessary. For example, an encoded target phone number may include a first portion that is the phone number of the phone decoder and router (925), a second portion that is the target phone number appended with a number mapped from an identifier of the media channel. To prevent the user from dialing the target phone number directly, an encryption/scrambling scheme can be used to encode the second portion, which is decoded at the phone decoder and router (925).

In one embodiment of the present invention, the phone decoder and router (925) determines the target phone number from the encoded target phone number dialed by the user and then dials the target phone number for the user and joins the phone calls so that the user can talk to the target phone.

In one embodiment of the present invention, users dial the encoded target phone numbers manually. A user can dial the encoded target phone number regardless the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment of the present invention, the encoded target phone numbers are presented in the content information in a format such that when the user selects the phone number the user device (e.g., a cellular phone or a computer) dials the encoded target phone number for the user. The user selection may be in the form of an keyboard/keypad input, a touch pad input, a track ball input, a mouse input, a voice command, etc.

In one embodiment, the user device initiates the phone call through a VoIP system when the user selects the encoded target phone number.

In one embodiment of the present invention, the user device dials the phone number for the user without the user manually press the sequence of the encoded target phone numbers. This greatly simplifies the process of make the phone call. Since a user device can dial a long sequence of number easily, a large number of digits can be used to encode the information without presenting any difficulties for the users.

In one embodiment of the present invention, the encoded target phone numbers are formatted so that the user device dials a first portion of the encoded target phone numbers to access the phone decoder and router (925), pauses for a short period of time for the phone decoder and router (925) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 9, the user device initiates the phone call. Alternatively, a phone router may be used to initiate phone calls both to the user device (or a separate user phone) and the target phone and then join the phone calls to connect the user to the target phone. For example, when the user selects the encoded target phone number, the selection of the target phone number is transmitted to the phone router with the user phone number. The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the phone router. Alternatively, the content information can be formatted so that the selection is sent directly to the server that is connected to the phone router.

When the router starts the phone calls, the encoded target phone number can also include alphabetic characters (and/or other characters). The server and/or the phone router can decode the encoded target phone number to recover/retrieve the target phone number and other associated information, such as the identity of the media channel that is creditable for providing the encoded target phone number to user.

Figure 10:
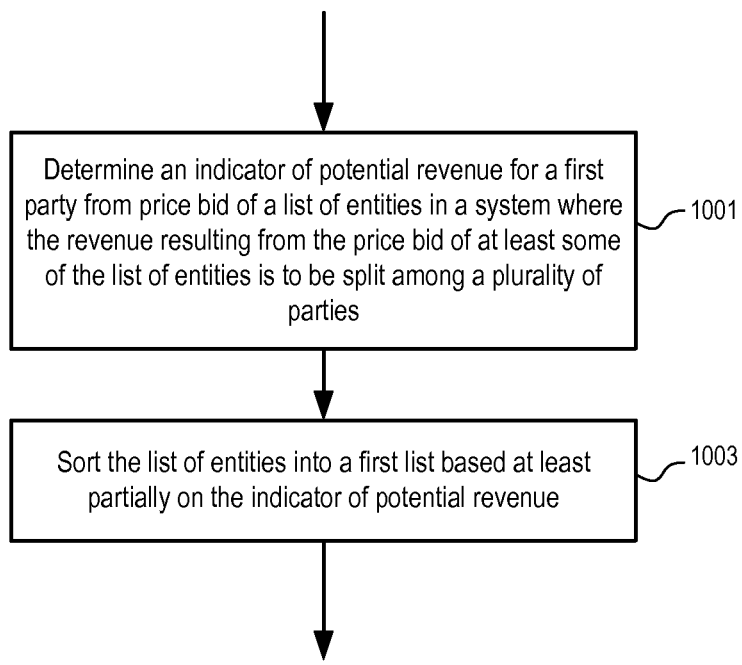
FIGS. 10-11 show flow diagrams of methods to sort seller listings according to embodiments of the present invention.
Figure 11:
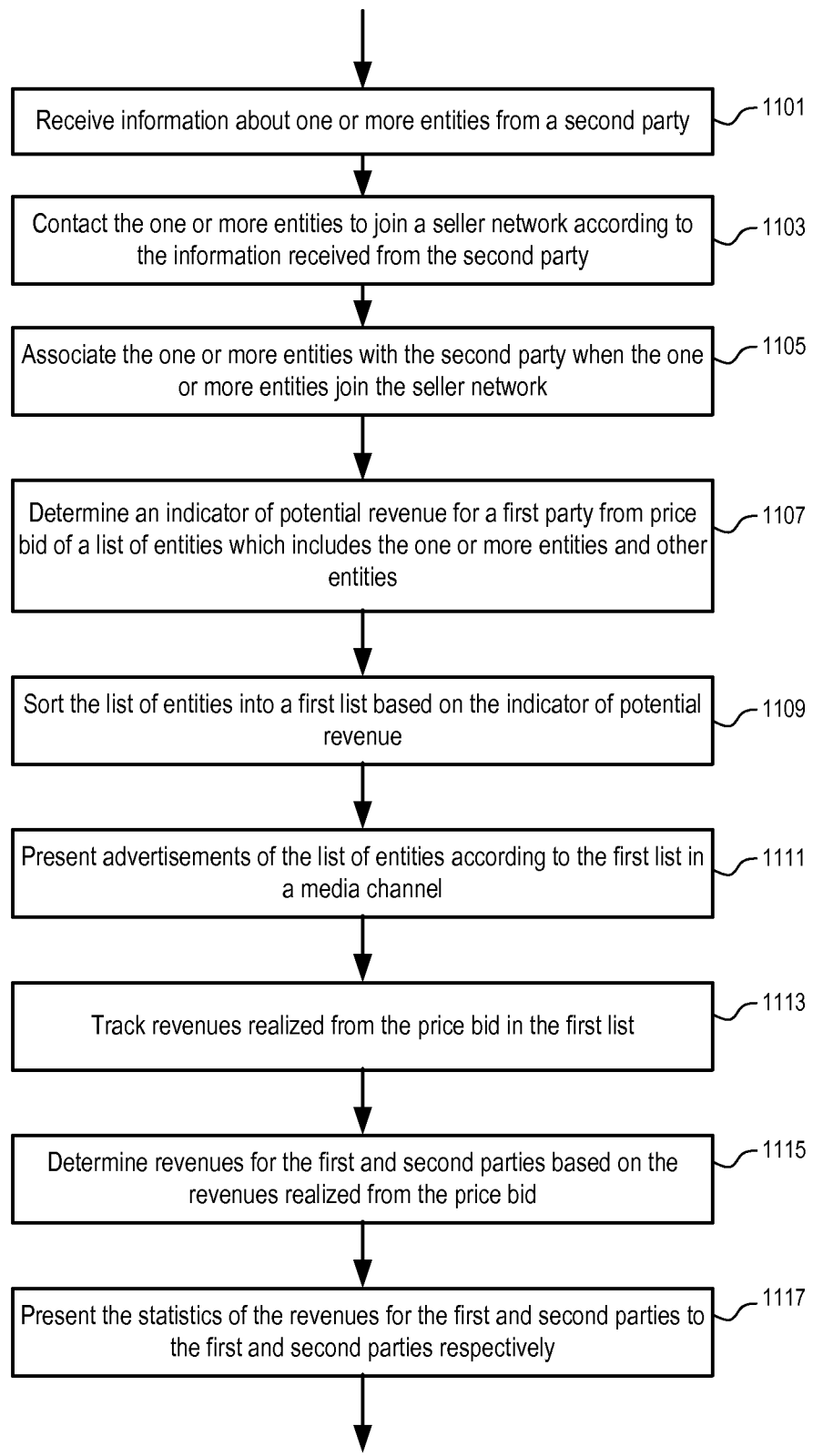

FIGS. 10-11 show flow diagrams of methods to sort seller listings according to embodiments of the present invention.

In FIG. 10, operation 1001 determines an indicator of potential revenue for a first party from price bid of a list of entities in a system where the revenue resulting from the price bid of at least some of the list of entities is to be split among a plurality of parties. Operation 1003 then sorts the list of entities into a first list based at least partially on the indicator of potential revenue.

In FIG. 11, operation 1101 receives information about one or more entities from a second party. Operation 1103 contacts the one or more entities to join a seller network according to the information received from the second party. Operation 1105 associates the one or more entities with the second party when the one or more entities join the seller network.

Alternatively, the second party may poll and manage the one or more entities and upload the entities to the seller network.

Operation 1107 determines an indicator of potential revenue for a first party from price bid of a list of entities which includes the one or more entities and other entities. Operation 1109 sorts the list of entities into a first list based on the indicator of potential revenue. Operation 1111 presents advertisements of the list of entities according to the first list in a media channel.

The one or more entities and other entities may contribute different percentages of the price bid to the revenue of the first party. For example, the price bid for the one or more entities is to be slit between the first and second parties; and the price bid for the other entities is not to be split between the first party and another party.

Operation 1113 tracks revenues realized from the price bid in the first list. Operation 1115 determines revenues for the first and second parties based on the revenues realized from the price bid. Operation 1117 presents the statistics of the revenues for the first and second parties to the first and second parties respectively.

In one embodiment, presentation of listings/advertisements is optimized based on the value/revenue to supply affiliates, demand affiliates, or the operator of the seller network, etc. Different types of channels used to deliver the advertisements may have different impact on the revenue generated from advertising. Different categories of advertisements may have different success rates in converting impression of advertisements into chargeable events to bring income. Further, individual performance-based advertisements may have different conversion rates which represent the ratio between the number of measurable events, which are generated from the advertisement and charged for the advertisements, and the number of presentations of the advertisements. Further, an advertisement may have different conversion rate on different media channels (e.g., text messaging, web, SMS, audio, video, newspaper, television, etc.) Further, in some embodiments, the measurable events may lead to commercial transactions, for which the seller network, the supplier affiliates and/or the demand affiliates may further charge service fees. Thus, in one embodiment of the present invention, an indicator of potential revenue that is expected to be generated from presenting the advertisements is computed from the prices for the advertisements, the statistical data representing the performance of the advertisements, and/or the revenue sharing scheme of the seller network, etc. The indicator of potential revenue can be used to improve or optimize the presentation of advertisements.

Figure 13:
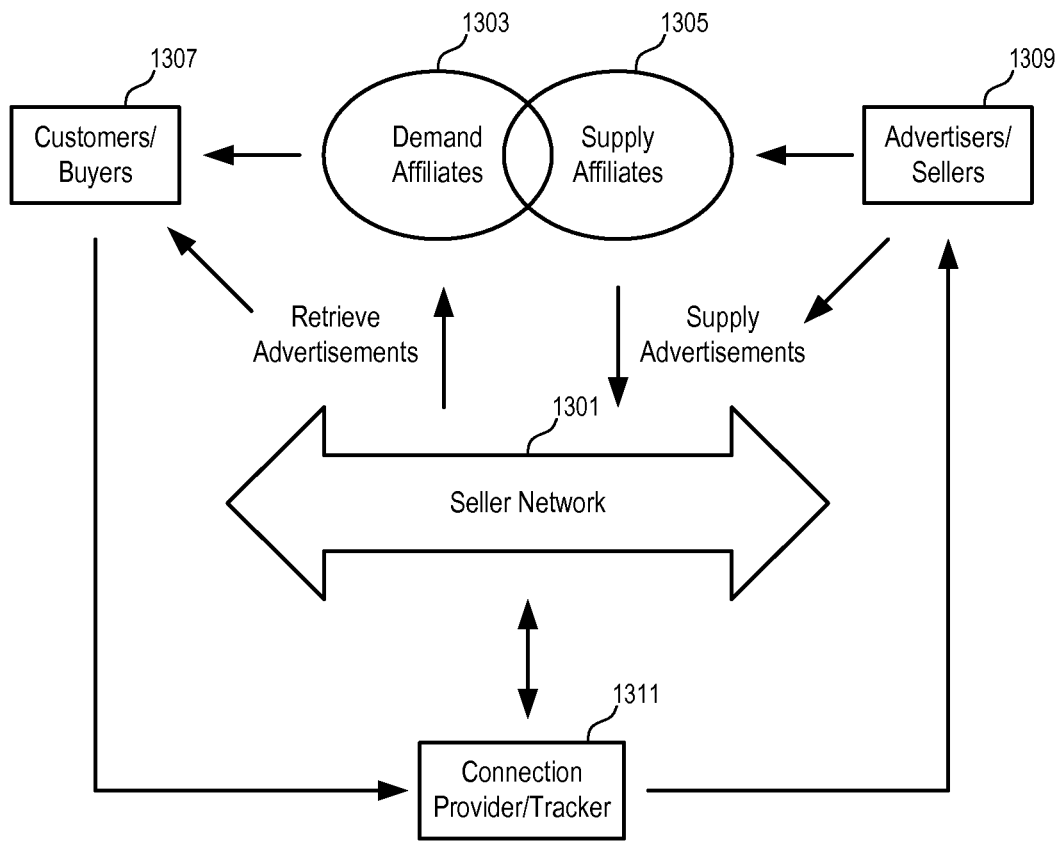
FIG. 13 shows a seller network according to one embodiment of the present invention.

FIG. 13 shows a seller network according to one embodiment of the present invention. In FIG. 13, a seller network (1301) may have supply affiliates (1305) and demand affiliates (1303). The supply affiliates (1305) provide advertisements of the advertises/sellers (1309) to the seller network (1301). The demand affiliates (1303) operate media channels to provide the advertisements to the customers/buyers (1307). Some affiliates may be both supply affiliates and demand affiliates. Supply affiliates earn their shares of the advertisement revenue for bringing the advertisers/sellers (1309) to the seller network (1301); and the demand affiliates earn their shares of the advertisement revenue for bringing the customers/buyers (1307) to the seller network (1301).

In one embodiment, at least some of the advertisers/sellers (1309) join the seller network (1301) directly; and at least some of the customers/buyers (1307) obtain the advertisements from the seller network (1301) directly. An operator of the seller network (1301) earns its shares of the advertisement revenue for maintaining the network, for presenting the advertisements to the customers/buyers (1307) directly, or indirectly via the demand affiliates, and for getting the advertisements from the advertisers/sellers (1309) directly, or indirectly via the supply affiliates.

In one embodiment, the advertisements are charged based on the communication leads generated from the advertisements. A connection provider/tracker (1311) tracks and/or connects the communication leads to the corresponding advertisers/sellers. For example, the advertisements may be charged based on telephone leads generated from the advertisements; and the connection provider/tracker (1311) tracks the telephone calls from the customer to the advertiser through connecting the telephone calls to the advertiser for the customer. The connection provider/tracker (1311) may also charge a portion of the communication cost to the customer and/or the advertiser (e.g., when the communication time for a connection exceeds a predetermined period, the advertiser may be charged for the remaining period of the communication).

In one embodiment, the connection provider/tracker and the operator of the seller network are the same entity. Alternatively, connection provider/tracker and the operator of the seller network can be different entities.

In one embodiment, the price for the advertisement is specified by the advertiser/seller (1309). Alternatively, the price for the advertisement can be specified by the seller network, or the demand affiliates, or the supply affiliates, or the connection providers/tracker. In one embodiment, the price of the advertisement is performance-based; and the advertisers are charged based on measurable events of interest to the advertisers, which events are generated as the result of the advertisements. Alternatively, the advertisement fees may be based on the presentation of the advertisement and/or the placement location of the advertisement.

In one embodiment, a demand affiliate may collect advertisement fees from the seller network based on events different from the events the seller network and/or the supplier affiliates charge the advertiser.

For example, a demand affiliate may collect an advertisement fee for each presentation of an advertisement and/or a premium for placing the advertisement at a specific location (e.g., on the top of a web page or list), or the demand affiliate may collect an advertisement fee for each user selection of a link embedded in the advertisement (e.g., pay per click). The seller network and/or the supplier affiliates may charge the advertiser for the advertisement based on a telephone connection (or other communication leads, such as an instant messaging connection, a video conferencing connection, an email lead, etc.) that is established as a result of the advertisement (e.g., pay per call). The demand affiliates may charge for the advertisements based on the type of the channels used to deliver the advertisements. For example, a text/web channel may be less expensive than an audio channel, which may be less expensive than a video channel. The seller network and/or the supplier affiliates may charge the advertiser for the leads regardless of the media channel used to generate the leads. The seller network and/or the supplier affiliates may charge the advertiser differently for different types of leads (e.g., phone call, email, instant messaging, video conferencing, etc.). In one embodiment, an advertisement may be presented in a combination of different channels; and a lead generated from an advertisement may include connections for a combination of different types of media (e.g., text, audio, video, etc.). Thus, the revenue sharing between different parties in the system may not be proportional a particular type of price that the advertiser is charged for the advertisement.

In one embodiment, the potential revenue that is expected to be generated from presenting an advertisement is a function of a number of parameters, such as the price the advertiser is being charged to, the cost for presenting the advertisement, the likelihood of generating an event for which the price can be charged (e.g., a call through rate), and/or other related potential benefits that can be generated from the success of the advertisement, such as the value of a first phone call generated from the advertisement, the likelihood of repeated phone calls following the first phone call, the value of repeated phone calls, etc. In one embodiment, the potential revenue includes the advertisement revenue and/or other types of revenues that are generated as a result of a successful advertisement. For example, as a result of a phone call from the customer in response to the advertisement, the customer may purchase services and/or products from the advertiser (seller); and the system may obtain a commission fee from the transaction performed while the customer and the advertiser (seller) are connected to each other via the system. For example, the seller may provide information, advise, entertainment, etc., over the phone connection provided by the system; the customer is charged based on the service time of the seller; and the service fee charged to the customer may be distributed among the seller, the connection system, a supply partner who bring the seller to the network, and/or a demand partner who brings the customer to the network. Statistic data on the call through rate, the average amount of purchases resulted from a phone call and/or the subsequent repeated calls, the likelihood of repeated calls, etc. can be used to estimate the potential revenue. In general, the potential revenue can be estimated using more or less parameters.

Figure 14:
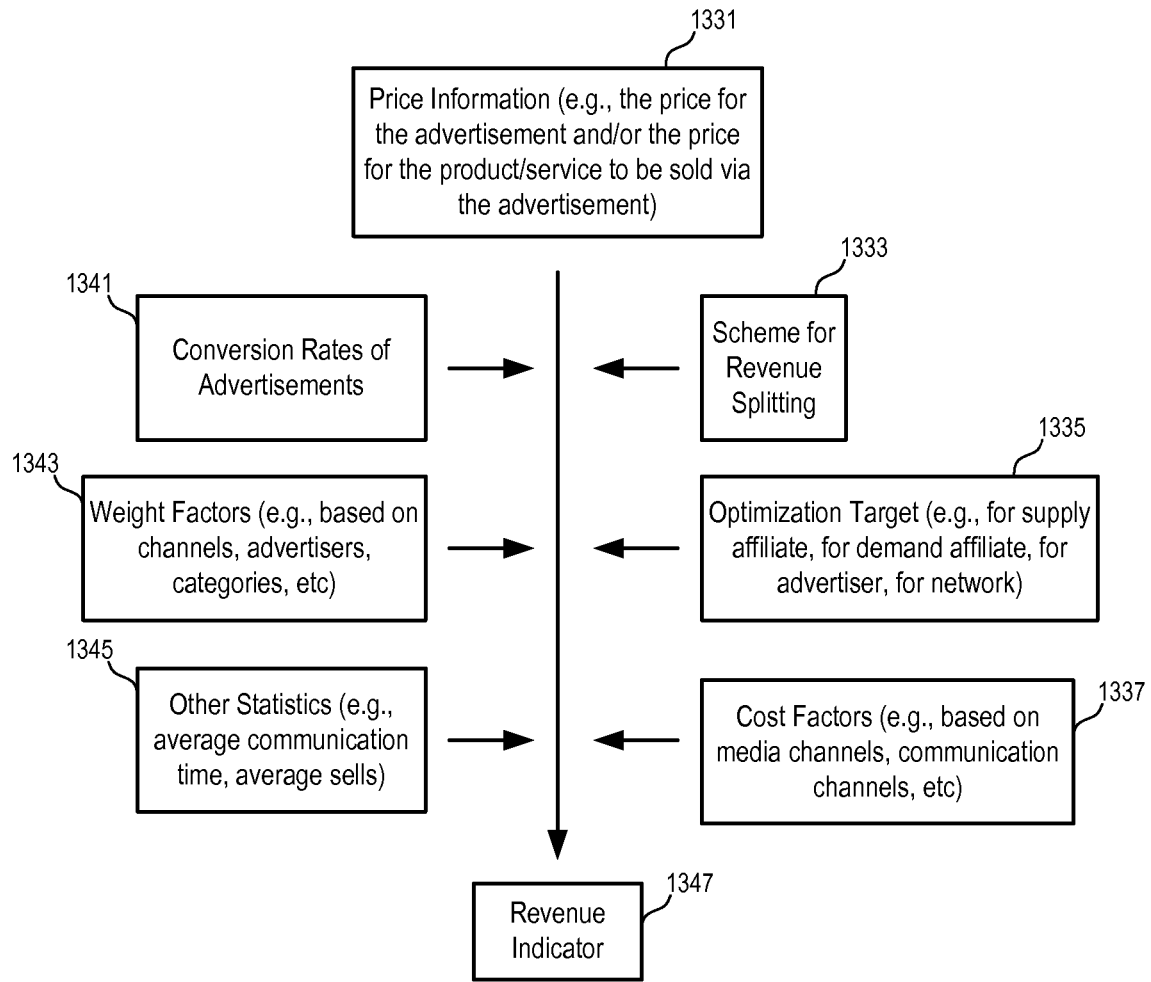
FIG. 14 illustrate a way to generate a revenue indicator according to one embodiment of the present invention.

FIG. 14 illustrate a way to generate a revenue indicator according to one embodiment of the present invention. In FIG. 14, the price information (1331) is used to generate a revenue indicator (1347), based on one or more additional considerations. The price information (1331) may include the price the advertiser will pay for the advertisement, and/or the price for the product/service to be sold via the advertisement.

For example, an adviser may advertise to sell advice over telephone connections established via the advertisement (or over other types of communication connections). The adviser may charge the customer based on a per-minute price for the communication time with the adviser. The seller network, the demand affiliate and/or the supply affiliate may deduct a portion of the advice fees as service charge. The likelihood of a sell resulting from a telephone lead generated from the advertisement can be used to estimate the portion of revenue that is a result of a purchase. Thus, the statistical data (1345), such as average communication time, average sells, etc., can be used to estimate the revenue indicator (1347).

In one embodiment, weight factors (1343) can also be used in the estimation of the revenue indicator. For example, different channels used for delivering advertisements, advertisers, categories of advertisements, and/or the type of communication connections required to connect the customer to the advertiser, etc. may have different costs or benefits. The weight factors can be used to approximately represent the costs and/or benefits in a statistical sense. For example, one media channel is more successful in generating chargeable events than another; and weight factors based on the media channels can be used to represent the differences in conversion rates based on the media channels. Weight factors can also be used to approximately represent the differences in conversion rates based on the advertisers, the categories of advertisements, etc.

In one embodiment, the conversion rates of the advertisements (1341) are tracked and used to determine the revenue indicator (1347). The conversion rates can be measured/traced for individual advertisements delivered through different types of media channels. Alternatively, the conversion rates may be tracked for categories of advertisements. In one embodiment, when the conversion rate for an individual advertisement is not available, the conversion rate for similar advertisements (e.g., similar based on geographic area, service/product type, etc.) can be used in estimating the revenue indicator (1347).

In one embodiment, the scheme (1333) for revenue splitting between or among cooperative parties in the advertising system is used to determine the share of revenue for a particular party (e.g., the operator of the seller network, a demand affiliate), or a type of parties (e.g., the seller affiliates) . The revenue indicator (1347) can be determined for a particular optimization target (1335), such as for the supply affiliates, or for a demand affiliate, or for the seller network, etc.

In one embodiment, cost factors (1337) can be explicitly considered in determining the revenue indicator (1347). For example, the cost can be determined based on the media channels used to deliver the advertisements. For example, different media channels may charge the seller network different fees for presenting advertisements. Different types of communication channels provided to connect the customers and the advertisers may have different communication costs. The costs can be deducted from the revenue to compute the revenue indicator (1347).

Figure 15:
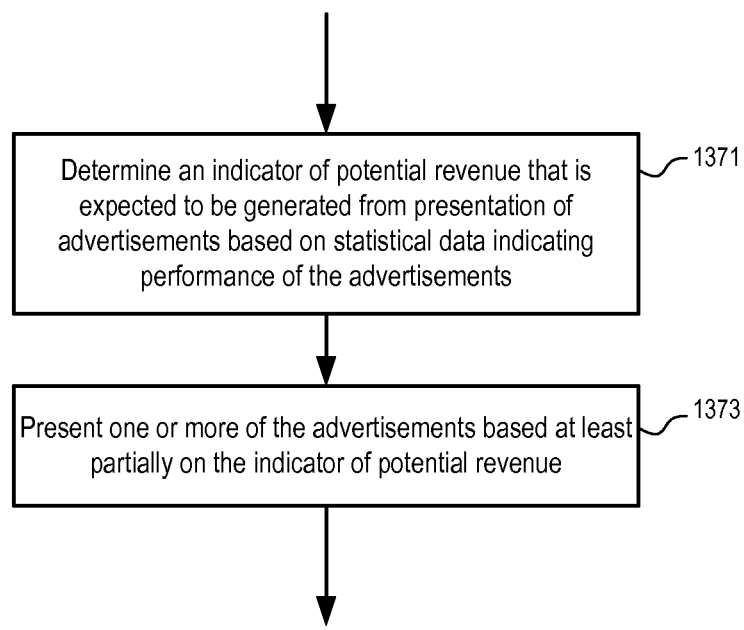
FIG. 15 illustrates a flow diagram of a method to present advertisements according to one embodiment of the present invention.

FIG. 15 illustrates a flow diagram of a method to present advertisements according to one embodiment of the present invention. In FIG. 15, an indicator of potential revenue that is expected to be generated from presentation of advertisements is determined (1371) based on statistical data indicating performance of the advertisements. One or more of the advertisements are presented (1373) based at least partially on the indicator of potential revenue.

In one embodiment, the advertisements are charged based on events generated in response to the advertisements, such as telephone connections established to advertisers via the advertisements, web visits directed from the advertisements, communication leads generated from the advertisements, etc. In one embodiment, the advertisements are charged according to prices specified by advertisers of the advertisements. For example, auctions can be conducted to allow the advertisers to specify the prices for the advertisements.

In one embodiment, the events generated in response to the advertisements to are tracked to generate the statistical data. For example, real time two-way communication connections established to advertisers of the advertisements can be tracked to determine conversion rates of the advertisements.

In one embodiment, the statistical data indicates likelihood of generating the events from presenting the advertisements. The statistical data may be for individual advertisements, may be based at least partially on categories of advertisements, may be based at least partially on a type of media channels used to deliver the advertisements. In one embodiment, the statistical data indicates costs to present the advertisements. In one embodiment, the statistical data includes a likelihood of receiving a request for a connection for real time communications in response to the advertisements, an expected amount of transaction during an initial connection in response to the advertisements, a likelihood of receiving one or more repeated requests for connections for real time communications after the initial connection, and/or an expected amount of transaction during subsequent connections in response to the repeated requests.

In one embodiment, presenting the advertisements includes: sorting the advertisements based at least partially on the indicator of potential revenue; and selecting the one or more of the advertisements based on said sorting. For example, lists of advertisements may be sorted according to the indicator of potential revenue to select advertisements for presentation in the sorted order.

In one embodiment, presenting the advertisements includes presenting the one or more of the advertisements in an order according to the indicator of potential revenue. For example, a set of selected advertisements may be sorted according to the indicator of potential revenue for presentation.

In one embodiment, the potential revenue is determined for supply affiliates of a seller network, a demand affiliate of the seller network, or an operator of the seller network. The income generated from presenting the advertisements may be divided among a plurality of parties (e.g., supply affiliates, demand affiliates, operator of the network) in the seller network.

In one embodiment, the potential revenue includes income generated from charging fees for the advertisements, as well as income generated from charging fees for facilitating commerce as a result of the advertisements.

Figure 12:
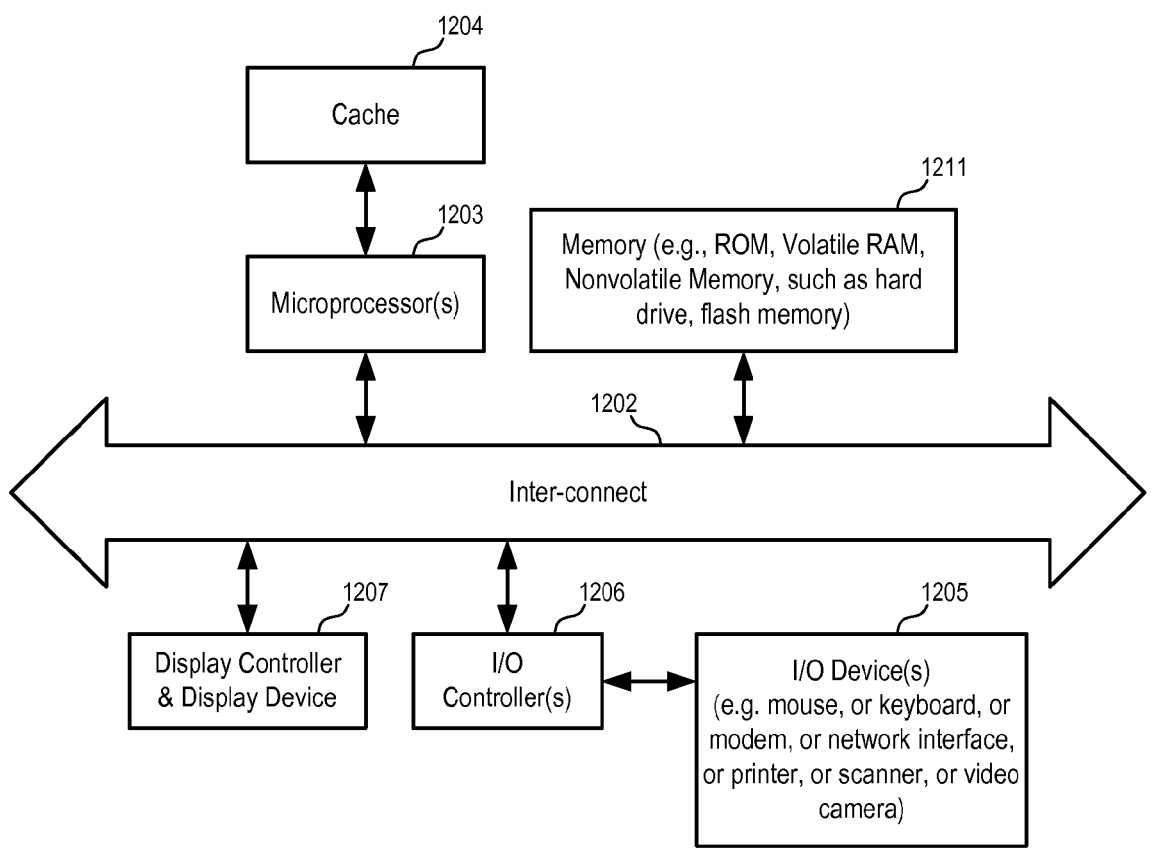
FIG. 12 shows a block diagram example of a data processing system which may be used with the present invention.

FIG. 12 shows a block diagram example of a data processing system which may be used with the present invention.

While FIG. 12 illustrates various components of a computer system, it is not intended to represent any particular architecture or manner of interconnecting the components. Other systems that have fewer or more components may also be used with the present invention.

In FIG. 12, the communication device (1201) is a form of a data processing system. The system (1201) includes an inter-connect (1202) (e.g., bus and system core logic), which interconnects a microprocessor(s) (1203) and memory (1211). The microprocessor (1203) is coupled to cache memory (1204) in the example of FIG. 12.

The inter-connect (1202) interconnects the microprocess(s) (1203) and the memory (1211) together and also interconnects them to a display controller and display device (1207) and to peripheral devices such as input/output (I/O) devices (1205) through an input/output controller(s) (1206). Typical I/O devices include mice, keyboards, modems, network interfaces, printers, scanners, video cameras and other devices which are well known in the art.

The inter-connect (1202) may include one or more buses connected to one another through various bridges, controllers and/or adapters. In one embodiment the I/O controller (1206) includes a USB (Universal Serial Bus) adapter for controlling USB peripherals, and/or an IEEE-1394 bus adapter for controlling IEEE-1394 peripherals.

The memory (1211) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment of the present invention, a server data processing system as illustrated in FIG. 12 is used in the processing system for a seller network to host seller network database, compute indicators of potential revenues for affiliates, track revenue generation and sharing for affiliates, provide interfaces for upload seller information, provide interfaces for affiliate reward reporting, and/or sorting seller listings for the affiliates, etc.

In one embodiment of the present invention, a server data processing system as illustrated in FIG. 12 is used in the processing system for an affiliate of a seller network to compute indicators of potential revenues, sorting seller listings according to indicators of potential revenues, provide seller listings to user terminals, and/or track revenue generation events, etc.

In one embodiment, a user terminal can be a data processing system similar to the system of FIG. 12, with more or less components. A data processing system as the user terminal can be in the form of a PDA, a cellular phone, a notebook computer, a personal desktop computer, etc.

Alternatively, the traditional communication client(s) may be used in some embodiments of the present invention.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention.

While some embodiments of the invention have been described in the context of fully functioning computers and computer systems, those skilled in the art will appreciate that various embodiments of the invention are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others, and transmission type media such as digital and analog communication links for electrical, optical, acoustical or other forms of propagated signals, such as carrier waves, infrared signals, digital signals, etc.

A machine readable medium can be used to store software and data which when executed by a data processing system causes the system to perform various methods of the present invention. The executable software and data may be stored in various places including for example ROM, volatile RAM, non-volatile memory and/or cache. Portions of this software and/or data may be stored in any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects of the present invention may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the present invention. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method implemented in a communication connection system to make and track connections for telephone communications, the method comprising:

tracking, by the communication connection system, real-time communications responsive to each advertisement of a plurality of advertisements, the real-time communications facilitated at least in part by a telephone router of the communication connection system and at least in part by voice over Internet protocol connections established responsive to user selections corresponding to advertisements of the plurality of advertisements;

generating, by the communication connection system, statistical data related to the real-time communications, the statistical data generated based at least in part on the tracking the real-time communications and comprising tracked communication times;

determining, by the communication connection system, for each advertisement of the plurality of advertisements, a respective indicator of potential revenue to a presenting party, the respective indicator of potential revenue reflecting revenue that is expected to be generated from presentation of the respective advertisement partially based on at least some of the statistical data comprising the tracked communication times and indicating a respective performance of the respective advertisement, the at least some of the statistical data indicating a respective likelihood of generating telephone connections established to a respective advertiser corresponding to each advertisement of the plurality of advertisements via the respective advertisement;

wherein actual revenue generated from presentation of the respective advertisement is divided among a plurality of parties in a seller network, such that the presenting party receives a share of the actual revenue generated from presentation of the respective advertisement according to a respective party percentage of the presenting party, wherein the respective indicator of potential revenue is based, in part, on the respective party percentage of the presenting party, and wherein the respective indicator of potential revenue is based, in part, on a respective weight of a respective one category of a plurality of categories associated with the respective advertisement; and selecting, by the communication connection system, at least one advertisement of the plurality of advertisements based at least partially on the respective indicator of potential revenue of the respective advertisement.

2. The method of claim 1, wherein the statistical data indicates costs to present the respective advertisement.

3. The method of claim 1, wherein the statistical data includes at least one of a likelihood of receiving a request for a connection for communications in response to the respective advertisement, a first expected amount of transaction during an initial connection in response to the respective advertisement, a likelihood of receiving repeated requests for connections for communications after the initial connection, and/or a second expected amount of transaction during subsequent connections in response to the repeated requests.

4. The method of claim 1, wherein the selecting the at least one advertisement of the plurality of advertisements comprises:

sorting the plurality of advertisements based at least partially on the respective indicator of potential revenue for each respective advertisement, and selecting the at least one of the plurality of advertisements based on the sorting.

5. The method of claim 1, further comprising:

transmitting the at least one advertisement of the plurality of advertisements for presentation in an order according to the indicator of potential revenue.

6. The method of claim 1, wherein the potential revenue is for one or more of:

a supply affiliate of a seller network;
a demand affiliate of the seller network; and/or
an operator of the seller network.

7. The method of claim 1, wherein the potential revenue includes first income generated from charging a fee for the respective advertisement.

8. The method of claim 7, wherein the potential revenue further includes second income generated from charging fees for facilitating commerce as a result of the respective advertisement.

9. The method of claim 1, wherein the respective indicator of potential revenue is additionally based, in part, on a respective weight of a respective one media channel of a plurality of media channels through which the respective advertisement is presented.

10. The method of claim 1, wherein a respective advertiser of each of the plurality of advertisements is charged in response to the respective performance of the advertisement, including the occurrence of a measurable event responsive to the respective advertisement.

11. The method of claim 10, wherein the respective advertiser of each of the plurality of advertisements is charged according to a respective price specified by the respective advertiser.

12. The method of claim 11, further comprising: conducting an auction to allow the respective advertiser of each of the plurality of advertisements to specify the respective price for the respective advertisement.

13. A non-transitory computer readable storage medium containing instructions which when executed by one or more processors of a communication connection system cause the one or more processors to perform a method, comprising:
    tracking real-time communications responsive to each advertisement of a plurality of advertisements, the real-time communications facilitated at least in part by a telephone router of the communication connection system and at least in part by voice over Internet protocol connections established responsive to user selections corresponding to advertisements of the plurality of advertisements;
    generating statistical data related to the real-time communications, the statistical data generated based at least in part on the tracking the real-time communications and comprising tracked communication times;
    determining, for each advertisement of the plurality of advertisements, a respective indicator of potential revenue to a presenting party, the respective indicator of potential revenue reflecting revenue that is expected to be generated from presentation of the respective advertisement partially based on at least some of the statistical data comprising the tracked communication times and indicating a respective performance of the respective advertisement, the at least some of the statistical data indicating a respective likelihood of generating telephone connections established to a respective advertiser of corresponding to each advertisement of the plurality of advertisements via the respective advertisement;
    wherein actual revenue generated from presentation of the respective advertisement is divided among a plurality of parties in a seller network, such that the presenting party receives a share of the actual revenue generated from presentation of the respective advertisement according to a respective party percentage of the presenting party,
    wherein the respective indicator of potential revenue is based, in part, on the respective party percentage of the presenting party, and
    wherein the respective indicator of potential revenue is based, in part, on a respective weight of a respective one category of a plurality of categories associated with the respective advertisement; and
    selecting at least one advertisement of the plurality of advertisements based at least partially on the respective indicator of potential revenue of the respective advertisement.

14. A communication connection system to make and track connections for telephone communications, the communication connection system comprising:
    one or more servers coupled to one or more network interfaces to facilitate access to a communication network, and memory coupled to the one or more servers and storing instructions that, when executed by the one or more servers, cause the system to:
    track real-time communications responsive to each advertisement of a plurality of advertisements, the real-time communications facilitated at least in part by a telephone router of the communication connection system and at least in part by voice over Internet protocol connections established responsive to user selections corresponding to advertisements of the plurality of advertisements;
    generate statistical data related to the real-time communications, the statistical data generated based at least in part on the tracking the real-time communications and comprising tracked communication times;
    determine, for each advertisement of the plurality of advertisements, a respective indicator of potential revenue to a presenting party, the respective indicator of potential revenue reflecting revenue that is expected to be generated from presentation of the respective advertisement partially based on at least some of the statistical data comprising the tracked communication times and indicating a respective performance of the respective advertisement, the at least some of the statistical data indicating a respective likelihood of generating telephone connections established to a respective advertiser corresponding to each advertisement of the plurality of advertisements via the respective advertisement;
    wherein actual revenue generated from presentation of the respective advertisement is divided among a plurality of parties in a seller network, such that the presenting party receives a share of the actual revenue generated from presentation of the respective advertisement according to a respective party percentage of the presenting party,
    wherein the respective indicator of potential revenue is based, in-part, on the respective party percentage of the presenting party, and
    wherein the respective indicator of potential revenue is based, in-part, on a respective weight of a respective one category of a plurality of categories associated with the respective advertisement; and
    select, at least one advertisement of the plurality of advertisements based at least partially on the respective indicator of potential revenue of the respective advertisement.

* * * * *